United States Patent
Li et al.

(10) Patent No.: US 10,790,511 B2
(45) Date of Patent: Sep. 29, 2020

(54) LITHIUM COBALT OXIDE POSITIVE ELECTRODE MATERIAL, METHOD FOR PREPARING SAME, AND LITHIUM-ION SECONDARY BATTERY

(71) Applicant: HUAWEI TECHNOLOGIES CO., LTD., Shenzhen, Guangdong (CN)

(72) Inventors: Yangxing Li, Shenzhen (CN); Dan Lei, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/422,078

(22) Filed: May 24, 2019

(65) Prior Publication Data
US 2019/0280296 A1    Sep. 12, 2019

Related U.S. Application Data

(63) Continuation of application No. PCT/CN2017/093010, filed on Jul. 14, 2017.

(30) Foreign Application Priority Data

Nov. 28, 2016  (CN) .......................... 2016 1 1064959
Jun. 22, 2017  (CN) .......................... 2017 1 0482648

(51) Int. Cl.
  *H02J 7/00*   (2006.01)
  *H02J 7/14*   (2006.01)
  (Continued)

(52) U.S. Cl.
  CPC .......... *H01M 4/525* (2013.01); *H01M 4/366* (2013.01); *H01M 10/0525* (2013.01);
  (Continued)

(58) Field of Classification Search
  USPC ....................................................... 320/107
  See application file for complete search history.

(56) References Cited

U.S. PATENT DOCUMENTS

2002/0037456 A1    3/2002  Hosoya
2002/0094481 A1*   7/2002  Goto .................... H01M 4/364
                                                              429/218.1
(Continued)

FOREIGN PATENT DOCUMENTS

CN    1324120 A    11/2001
CN    1349273 A    5/2002
(Continued)

OTHER PUBLICATIONS

G.G.Amatucci et al. CoO2, the end member of the LixCoO2 solid solution, J.Electrochem.Soc., vol. 143,No. 3,1996. pp. 1114-1123.
(Continued)

*Primary Examiner* — Alexis B Pacheco
(74) *Attorney, Agent, or Firm* — Womble Bond Dickinson (US) LLP

(57) ABSTRACT

The present application provides a lithium cobalt oxide positive electrode material, that is, a doped lithium cobalt oxide material: A general formula of doped lithium cobalt oxide is $Li_{1+z}Co_{1-x-y}Ma_xMb_yO_2$, where $0 \leq x \leq 0.01$, $0 \leq y \leq 0.01$, and $-0.05 \leq z \leq 0.08$; Ma is a doped monovalent element, and is at least one of Al, Ga, Hf, Mg, Sn, Zn, or Zr; and Mb is a doped polyvalent element, and is at least one of Ni, Mn, V, Mo, Nb, Cu, Fe, In, W, or Cr. Through substitutional doping of a monovalent element, mutation of a layered structure caused by lithium deintercalation is minimized. Through interstitial doping of a polyvalent element, oxidation of $Co^{3+}$ is alleviated and delayed during charging.

9 Claims, 8 Drawing Sheets

(51) Int. Cl.
*H01M 4/525* (2010.01)
*H01M 4/36* (2006.01)
*H01M 10/0525* (2010.01)
*H01M 10/46* (2006.01)
*H01M 4/02* (2006.01)

(52) U.S. Cl.
CPC ........... *H01M 10/46* (2013.01); *H02J 7/0045* (2013.01); *H01M 2004/028* (2013.01); *H01M 2220/30* (2013.01)

(56) References Cited

U.S. PATENT DOCUMENTS

| | | | | |
|---|---|---|---|---|
| 2006/0093914 A1* | 5/2006 | Tanaka | ............... | H01M 2/345 429/231.1 |
| 2016/0156032 A1* | 6/2016 | Lee | ............... | H01M 4/525 252/182.1 |
| 2016/0211517 A1* | 7/2016 | Beck | ............... | H01M 4/131 |
| 2018/0123128 A1* | 5/2018 | Kang | ............... | H01M 4/505 |

FOREIGN PATENT DOCUMENTS

| | | |
|---|---|---|
| CN | 1406398 A | 3/2003 |
| CN | 1316652 C | 5/2007 |
| CN | 102339998 A | 2/2012 |
| CN | 103066261 A | 4/2013 |
| CN | 103137961 A | 6/2013 |
| CN | 103280578 A | 9/2013 |
| CN | 103633329 A | 3/2014 |
| CN | 103746114 A | 4/2014 |
| CN | 103779556 A | 5/2014 |
| CN | 104529435 A | 4/2015 |
| CN | 105118991 A | 12/2015 |
| CN | 105406036 A | 3/2016 |
| CN | 105449197 A | 3/2016 |
| CN | 105470500 A | 4/2016 |
| CN | 103000880 B | 5/2016 |
| CN | 105680009 A | 6/2016 |
| CN | 104037407 B | 4/2017 |
| WO | 2012052810 A1 | 4/2012 |
| WO | 2013/062663 A1 | 5/2013 |
| WO | 2016/175426 A1 | 11/2016 |
| WO | 2018095052 A1 | 5/2018 |

OTHER PUBLICATIONS

H. Xia et al. Electrochemical behavior and Li diffusion study of LiCoO2 thin film electrodes prepared by PLD, Advanced Materials for Micro-and Nano-system, 2007, total 6 pages.

* cited by examiner

LITHIUM COBALT OXIDE POSITIVE ELECTRODE MATERIAL, METHOD FOR PREPARING SAME, AND LITHIUM-ION SECONDARY BATTERY

CROSS-REFERENCE TO RELATED APPLICATIONS

This application is a continuation of International Application No. PCT/CN2017/093010, filed on Jul. 14, 2017, which claims priority to Chinese Patent Application No. 201611064959.7, filed on Nov. 28, 2016 and Chinese Patent Application No. 201710482648.0, filed on Jun. 22, 2017, the disclosures of which are incorporated herein by reference in their entireties.

TECHNICAL FIELD

The present application relates to the field of materials, and in particular, to a lithium cobalt oxide positive electrode material, a method for preparing the lithium cobalt oxide positive electrode material, and a lithium-ion secondary battery.

BACKGROUND

Currently, lithium-ion batteries have been widely used in various electronic devices (for example, a mobile phone, and a tablet computer). As people's requirements for performance of electronic devices keep increasing, people have higher requirements for volumetric energy density of lithium-ion batteries. It should be pointed out that volumetric energy density of a battery=discharge capacity×discharge plateau voltage×compact density. As a charge cut-off voltage of a positive electrode material is increased, a discharge capacity and a discharge plateau voltage may be increased, thereby increasing the volumetric energy density of the battery. However, when a lithium-ion battery is charged to 4.2 V, lithium ions in $LiCoO_2$ are deintercalated to form $Li_{1-x}CoO_2$ ($0 \leq x \leq 0.5$). When a charge voltage is increased above 4.4 V, more lithium ions are deintercalated from $LiCoO_2$, and as a result, $LiCoO_2$ is transformed from a hexagonal crystal system into a monoclinic crystal system and no longer has a function of reversible intercalation and deintercalation of lithium ions. In addition, the process is further accompanied with dissolution of cobalt ions in an electrolytic solution. Therefore, an actual capacity (150 mAh·g$^{-1}$) of a lithium-ion battery positive electrode material, that is, lithium cobalt oxide is far less than a theoretical capacity (274 mAh·g$^{-1}$) thereof.

Therefore, there is an urgent need to develop a lithium-ion battery positive electrode material that has desirable cycling performance at a high voltage and a relatively high power capacity and that can buffer or release stress caused by variation of a lattice constant during charging and discharging.

SUMMARY

In view of this, embodiments of the present application provide a lithium-ion battery positive electrode material that has desirable cycling performance and a relatively high power capacity and that can buffer or release stress caused by variation of a lattice constant during charging and discharging.

A first aspect of the present application discloses a lithium cobalt oxide positive electrode material, where the lithium cobalt oxide positive electrode material includes doped lithium cobalt oxide, where a general formula of a substance forming the doped lithium cobalt oxide is $Li_{1+z}Co_{1-x-y}Ma_xMb_yO_2$, where $0 \leq x \leq 0.01$, $0 \leq y \leq 0.01$, and $-0.05 \leq z \leq 0.08$; Ma is a doped monovalent element, and Ma is at least one of Al, Ga, Hf, Mg, Sn, Zn, or Zr; Mb is a doped polyvalent element, and Mb is at least one of Ni, Mn, V, Mo, Nb, Cu, Fe, In, W, or Cr; and a lattice of the doped lithium cobalt oxide includes a main sheet formed of a cobalt-ion layer and an oxygen-ion layer and lithium-ion layers distributed on two sides of the main sheet, the main sheet further includes the doped monovalent element Ma and the doped polyvalent element Mb, and the monovalent element Ma is used to substitute for a cobalt ion in the main sheet.

In one embodiment, a surface coating layer is further included, where the surface coating layer covers a surface of the doped lithium cobalt oxide, a general formula of a substance forming the surface coating layer is $Li_{\gamma 1}Mc_{\gamma 2}O_{\gamma 3}$, Mc is at least one of Cr, Co, Ni, Cu, Mn, Ti, Zr, Hf, La, Nb, In, W, Ta, Ba, Te, Y, Sb, or P, $\gamma 1$, $\gamma 2$, and $\gamma 3$ may be any positive numbers but need to satisfy the following formula: $\gamma 1 + A^* \gamma 2 = 2^* \gamma 3$, and A is a valence of Mc. The substance of the surface coating layer includes an inorganic solid electrolytic material and a high-voltage active material.

With reference to the lithium cobalt oxide positive electrode material disclosed in the foregoing, in one embodiment, the monovalent element Ma and the main sheet are bonded through ionic bonding, the main sheet includes an oxygen-ion layer, a cobalt-ion layer, and an oxygen-ion layer that are sequentially arranged, and the cobalt-ion layer is located between the two oxygen-ion layers.

With reference to the lithium cobalt oxide positive electrode material disclosed in the foregoing, in one embodiment, a variation range of a c-axis size of a lattice of the lithium cobalt oxide positive electrode material is 14.055 Å to 14.095 Å.

With reference to the lithium cobalt oxide positive electrode material disclosed in the foregoing, in one embodiment, $0.0005 \leq x \leq 0.005$. For example, x may be 0.004 or 0.003.

With reference to the lithium cobalt oxide positive electrode material disclosed in the foregoing, in one embodiment, $0.0005 \leq y \leq 0.005$. For example, y may be 0.005 or 0.0008.

With reference to the lithium cobalt oxide positive electrode material disclosed in the foregoing, in one embodiment, $0.01 \leq z \leq 0.03$. z may be 0.01 or 0.02.

With reference to the lithium cobalt oxide positive electrode material disclosed in the foregoing, in one embodiment, the lattice of the doped lithium cobalt oxide includes the main sheet that is mainly formed of a cobalt-ion layer and an oxygen-ion layer and the lithium-ion layers distributed on the two sides of the main sheet, the main sheet further includes the doped monovalent element Ma and the doped polyvalent element Mb, the monovalent element Ma is used to substitute for a cobalt ion in the main sheet before doping. The polyvalent element Mb is filled between a cobalt-ion layer and an oxygen-ion layer of the main sheet. Specifically, a polyvalent element ion is filled in a tetrahedral space formed with one cobalt ion and three oxygen ions on an oxygen-ion layer being vertices, or, is filled in a tetrahedral space formed with one oxygen ion and three cobalt ions on a cobalt-ion layer being vertices.

A second aspect of the present application discloses a method for preparing a lithium cobalt oxide positive electrode material, where the method includes:

preparing an aqueous solution of a cobalt source and a compound containing a monovalent element Ma, and mixing the aqueous solution, a complex solution, and a precipitating agent solution, so that the aqueous solution, the complex solution, and the precipitating agent solution react and crystallize, to obtain Ma-doped cobalt carbonate or hydroxide, where Ma is at least one of Al, Ga, Hf, Mg, Sn, Zn, or Zr;

mixing the obtained Ma-doped cobalt carbonate or hydroxide and a compound containing a polyvalent element Mb, and sintering the mixed compounds at a temperature of 800° C. to 1000° C. for 4 hours to 10 hours to obtain an Ma-Mb codoped Co oxide precursor, where Mb is at least one of Ni, Mn, V, Mo, Nb, Cu, Fe, In, W, or Cr;

mixing the obtained Ma-Mb codoped Co oxide precursor and a lithium source, and sintering a mixture of the oxide precursor and the lithium source at a temperature of 950° C. to 1100° C. for 8 hours to 16 hours to obtain an Ma-Mb codoped doped lithium cobalt oxide; and mixing the lithium source, a compound containing an element Mc, and the obtained Ma-Mb codoped doped lithium cobalt oxide, and sintering a mixture at a temperature of 850° C. to 1050° C. for 8 hours to 16 hours to obtain the lithium cobalt oxide positive electrode material, where Mc is at least one of Cr, Co, Ni, Cu, Mn, Ti, Zr, Hf, La, Nb, In, W, Ta, Ba, Te, Y, Sb, or P.

In one embodiment, the last step in the second aspect is processed by means of solid-phase coating.

In one embodiment, the last step in the second aspect may be replaced with: by means of liquid-phase coating, mixing the lithium source, the compound containing the element Mc, and the obtained Ma-Mb codoped doped lithium cobalt oxide in a liquid phase and drying a mixture, and sintering the dried mixture at a temperature of 850° C. to 1050° C. for 8 hours to 16 hours, to obtain a doped and surface coating co-modified lithium cobalt oxide positive electrode material.

In one embodiment, the mixing the aqueous solution, a complex solution, and a precipitating agent solution, so that the aqueous solution, the complex solution, and the precipitating agent solution react and crystallize, to obtain Ma-doped cobalt carbonate or hydroxide includes: mixing the aqueous solution containing Co ions and monovalent element Ma ions and the precipitating agent solution in a manner of parallel flow control, where a speed of the parallel flow control does not exceed 200 L/h, a stirring speed does not exceed 200 rpm, and a crystallization temperature does not exceed 100° C.

In one embodiment, the cobalt source is at least one of cobalt acetate, cobalt oxalate, cobalt nitrate, cobalt sulfate, or cobalt chloride; the compound containing the monovalent element Ma is at least one of a nitrate, an oxalate, an acetate, a fluoride, a chloride, or a sulfate containing Ma; a concentration of the Co ions in the aqueous solution containing the Co ions and the monovalent element Ma ions is 0.5 mol/L to 2.0 mol/L; the precipitating agent solution is a strong base solution, a carbonate solution, or an oxalic acid or oxalate solution; the complexing agent solution is an ammonia solution or a solution of aminooxyacetic acid salt; the compound containing the polyvalent element Mb is selected from at least one of an oxide, a hydroxide, a carbonate, a nitrate, an oxalate, or an acetate containing Mb; the lithium source is at least one of lithium hydroxide, lithium nitrate, lithium carbonate, lithium oxalate, lithium acetate, lithium oxide, or lithium citrate; or the compound containing the element Mc is at least one of an oxide, a hydroxide, a carbonate, a nitrate, an oxalate, or an acetate containing Mc.

A third aspect of the present application discloses another method for preparing a lithium cobalt oxide positive electrode material, where the method includes:

preparing an aqueous solution of a cobalt source and a compound containing a monovalent element Ma, and mixing the aqueous solution, a complex solution, and a precipitating agent solution, so that the aqueous solution, the complex solution, and the precipitating agent solution react and crystallize, to obtain Ma-doped cobalt carbonate or hydroxide, where Ma is at least one of Al, Ga, Hf, Mg, Sn, Zn, or Zr;

sintering the obtained Ma-doped cobalt carbonate or hydroxide at a temperature of 900° C. to 1000° C. to obtain an Ma-doped precursor $Co_3O_4$, where a sintering time is 4 h to 10 h;

sintering a lithium source, a compound containing Mb, and the Ma-doped precursor $Co_3O_4$ at a temperature of 950° C. to 1100° C. for 8 hours to 16 hours to obtain an Ma-Mb codoped doped lithium cobalt oxide; and mixing the lithium source, a compound containing an element Mc, and the obtained Ma-Mb codoped doped lithium cobalt oxide, and sintering a mixture at a temperature of 850° C. to 1050° C. for 8 hours to 16 hours, to obtain the lithium cobalt oxide positive electrode material, where Mc is at least one of Cr, Co, Ni, Cu, Mn, Ti, Zr, Hf, La, Nb, In, W, Ta, Ba, Te, Y, Sb, or P.

In one embodiment, the last step in the third aspect may be replaced with: by means of liquid-phase coating, mixing the lithium source, the compound containing the element Mc, and the obtained Ma-Mb codoped doped lithium cobalt oxide in a liquid phase and drying a mixture, and sintering the dried mixture at a temperature of 850° C. to 1050° C. for 8 hours to 16 hours, to obtain a doped and surface coating co-modified lithium cobalt oxide positive electrode material.

In one embodiment, the mixing the aqueous solution, a complex solution, and a precipitating agent solution, so that the aqueous solution, the complex solution, and the precipitating agent solution react and crystallize, to obtain Ma-doped cobalt carbonate or hydroxide includes:

mixing the aqueous solution containing Co ions and monovalent element Ma ions and the precipitating agent solution in a manner of parallel flow control, where a speed of the parallel flow control does not exceed 200 L/h, a stirring speed does not exceed 200 rpm, and a crystallization temperature does not exceed 100° C.

In one embodiment, the cobalt source is at least one of cobalt acetate, cobalt oxalate, cobalt nitrate, cobalt sulfate, or cobalt chloride; the compound containing the monovalent element Ma is at least one of a nitrate, an oxalate, an acetate, a fluoride, a chloride, or a sulfate containing Ma; a concentration of the Co ions in the aqueous solution containing the Co ions and the monovalent element Ma ions is 0.5 mol/L to 2.0 mol/L; the precipitating agent solution is a strong base solution, a carbonate solution, or an oxalic acid or oxalate solution; the complexing agent solution is an ammonia solution or a solution of aminooxyacetic acid salt; the compound containing a polyvalent element Mb is selected from at least one of an oxide, a hydroxide, a carbonate, a nitrate, an oxalate, or an acetate containing Mb; the lithium source is at least one of lithium hydroxide, lithium nitrate, lithium carbonate, lithium oxalate, lithium acetate, lithium oxide, or lithium citrate; or the compound containing the element Mc is at least one of an oxide, a hydroxide, a carbonate, a nitrate, an oxalate, or an acetate containing Mc.

A fourth aspect of the present application discloses a lithium-ion battery, where the lithium-ion battery includes a positive electrode plate, a negative electrode plate, an electrolytic solution, and an isolation film placed between the positive electrode plate and the negative electrode plate, where the positive electrode plate includes a positive electrode current collector and a positive electrode active substance layer distributed on the positive electrode current collector, and the positive electrode active substance layer uses the lithium cobalt oxide positive electrode material according to the first aspect or any possible implementation of the first aspect as a positive electrode active substance.

In one embodiment, an active capacity of the lithium cobalt oxide positive electrode material is greater than 190 mAh/g.

A fifth aspect of the present application discloses an electronic device, where the electronic device includes the lithium-ion battery according to the fourth aspect.

It can be learned from above that the embodiments of the present application disclose a lithium cobalt oxide positive electrode material. The lithium cobalt oxide positive electrode material includes doped lithium cobalt oxide and a surface coating layer, where a general formula of the doped lithium cobalt oxide is $Li_{1+z}Co_{1-x-y}Ma_xMb_yO_2$, where $0 \leq x \leq 0.01$, $0 \leq y \leq 0.01$, and $-0.05 \leq z \leq 0.08$; Ma is a doped monovalent element, and Ma is at least one of Al, Ga, Hf, Mg, Sn, Zn, or Zr; and Mb is a doped polyvalent element, and Mb is at least one of Ni, Mn, V, Mo, Nb, Cu, Fe, In, W, or Cr. It can be learned according to the foregoing description, the lithium cobalt oxide positive electrode material provided in the present application is doped with the polyvalent element and doped with the monovalent element. The monovalent element substitutes for a cobalt ion in a main sheet of a lattice structure of the lithium cobalt oxide in a manner of substitutional doping, to ensure that a framework and a cobalt position of a layered structure do not mutate due to oxidation, so that stability of the layered structure of the lithium cobalt oxide positive electrode material can be improved during high-voltage use. On the other hand, by means of interstitial doping, the polyvalent element is filled between a cobalt-ion layer and an oxygen-ion layer of the main sheet of the lattice structure of the lithium cobalt oxide. In one embodiment, a polyvalent element ion is filled in a tetrahedral space formed with one cobalt ion and three oxygen ions on an oxygen-ion layer being vertices, or, is filled in a tetrahedral space formed with one oxygen ion and three cobalt ions on a cobalt-ion layer being vertices, so as to mitigate or release stress caused by variation of the framework of the layered structure, thereby stabilizing the layered structure of the lithium cobalt oxide. In the present application, a principle and a process of a phase change of the layered structure of the lithium cobalt oxide in a high voltage scenario is combined, and advantages of doped elements are fully exploited, thereby significantly improving comprehensive performance of a positive electrode material.

The advantages of the embodiments of the present application are partially described in the specification below. Some of the advantages are obvious according to the specification, or may be learned by implementing the embodiments of the present application.

DESCRIPTION OF EMBODIMENTS

To make the purpose, technical solutions, and advantages of the embodiments of the present application clearer, the following describes the technical solutions of the embodiments of the present application with reference to the accompanying drawings in the embodiments of the present application.

Figure 1:
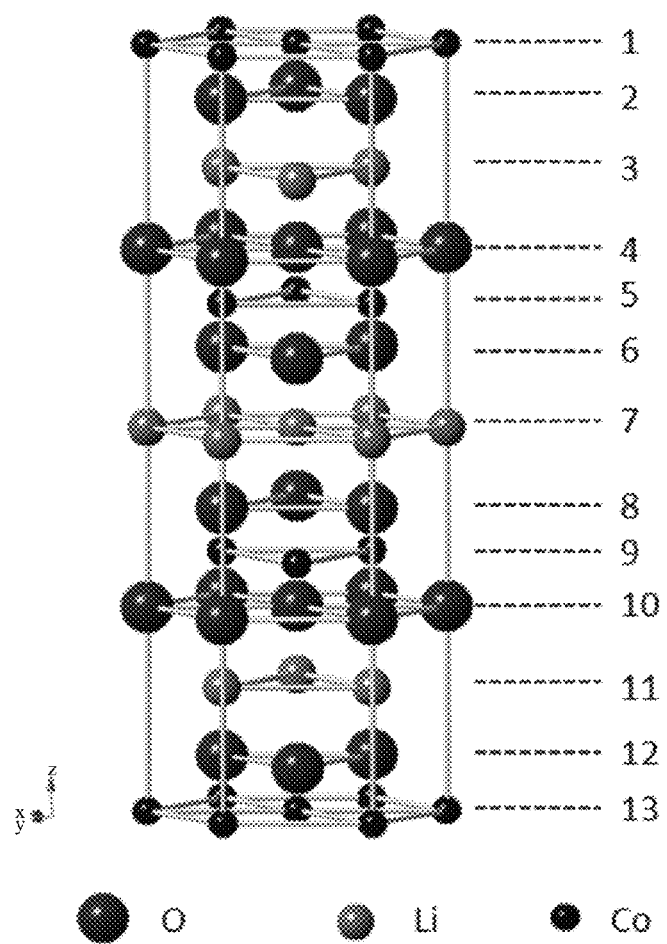
FIG. 1 is a schematic diagram of a lattice structure of layered lithium cobalt oxide according to one embodiment.

FIG. 1 shows a lattice structure of layered lithium cobalt oxide. As shown in FIG. 1, the lattice structure of the lithium cobalt oxide has a typical structure of $\alpha$-$NaFeO_2$ and is a hexagonal crystal system and a space group $R\bar{3}m$. FIG. 1 shows one cell of a layered structure in the lattice structure of the lithium cobalt oxide. From top to bottom along a z axis, the layered structure includes a cobalt layer, an oxygen layer, a lithium layer, an oxygen layer, a cobalt layer, an oxygen layer, a lithium layer, an oxygen layer, a cobalt layer, an oxygen layer, a lithium layer, an oxygen layer, and a cobalt layer. The layers respectively correspond to numbers 1 to 13. Oxygen ions form a densely packed layer. The cobalt layers and the lithium layers are alternately distributed on two sides of oxygen layers. A cobalt layer and oxygen layers form a $CoO_2$ main sheet. For example, in FIG. 1, the fourth layer to the sixth layer form a main sheet, and the eighth layer to the tenth layer form a main sheet. A sheet structure of $CoO_2$ provides a two-dimensional channel for migration of lithium ions. For example, in FIG. 1, the seventh layer is a lithium-ion migration layer sandwiched between $CoO_2$ sheets.

Figure 2:
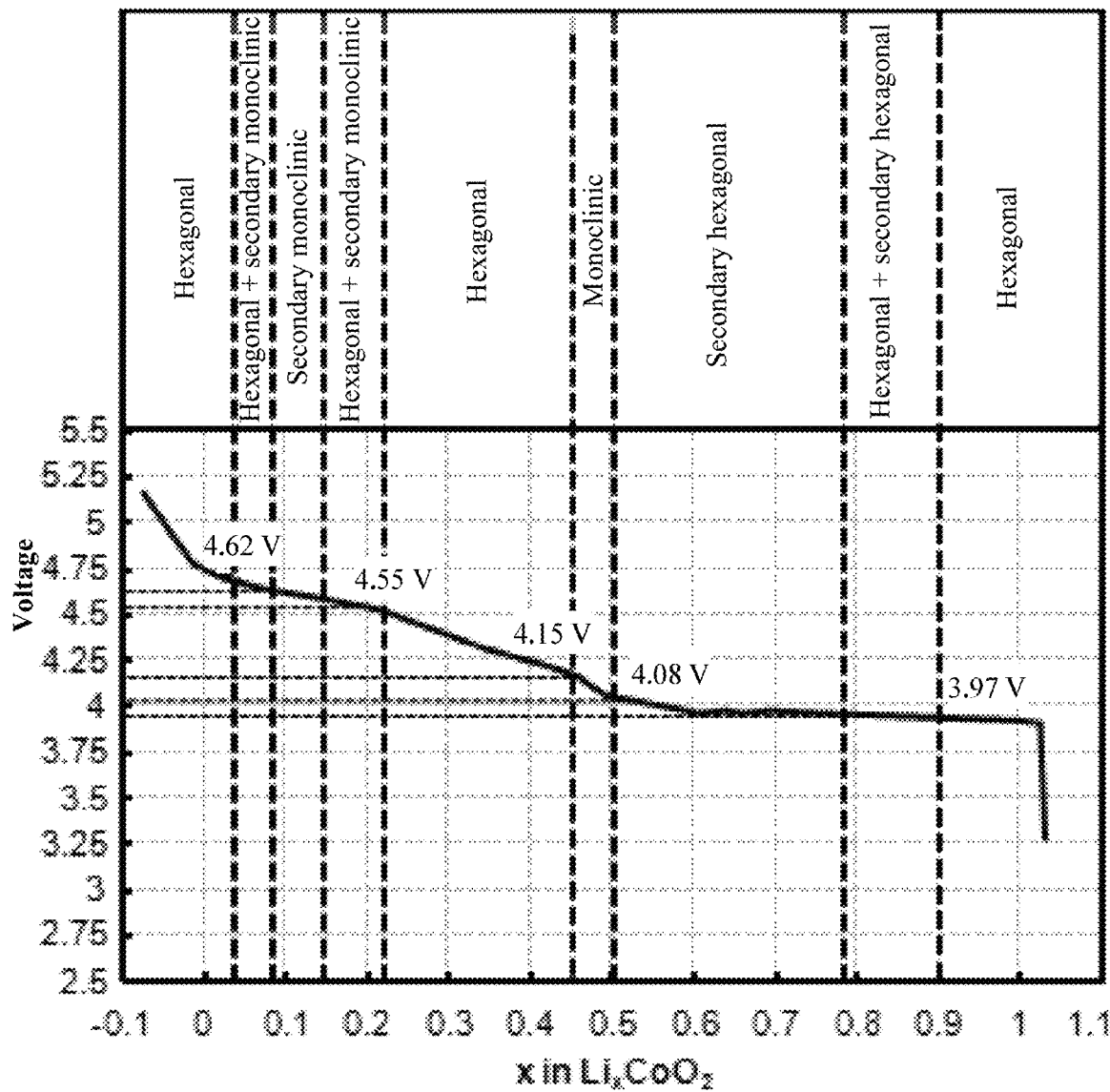
FIG. 2 is a schematic diagram of a process of a phase change of lithium cobalt oxide in different charge states.

To achieve high energy density, a charge cut-off voltage for working of lithium cobalt oxide keeps increasing, and has increased from 4.2 V to 4.35 V and further to 4.4 V nowadays. Each time a working voltage of lithium cobalt oxide is increased by 0.1 V, a discharge specific capacity of the lithium cobalt oxide may be approximately increased by 10%, and a discharge voltage plateau is increased by approximately 0.02 V. However, after the cut-off voltage is increased (particularly above 4.3 V), the layered lithium cobalt oxide has an unstable structure and an unstable surface, resulting in generation of micro fractures and cobalt dissolution, and causing collapse of the lattice structure and an irreversible phase change. FIG. 2 shows a process of a phase change during charging. A specific variation process is as follows.

Figure 3:
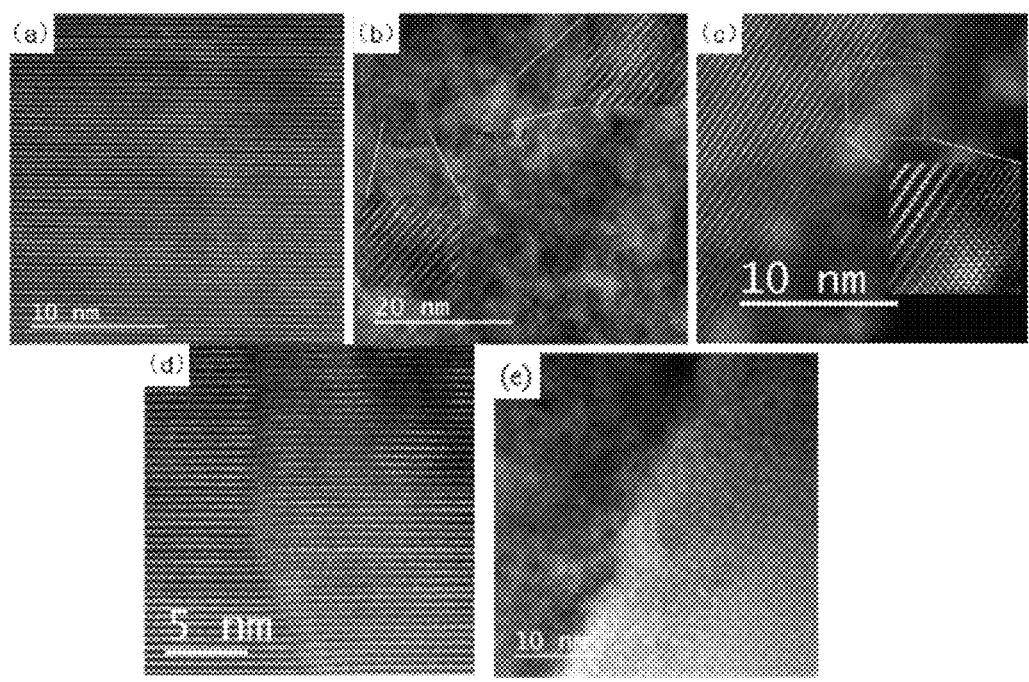
FIG. 3 is a schematic diagram of a phase change of lithium cobalt oxide during charging.

For $Li_xCoO_2$, when x=1 to 0.9, an initial layered structure of lithium cobalt oxide is kept and is a hexagonal crystal system (FIG. 3(a)). When x=0.9 to 0.78, the initial hexagonal crystal system is transformed into a secondary hexagonal crystal system, and in this range, two phases coexist. The reason for this transformation is that with deintercalation of lithium ions, an insulation area (Mott insulator) is generated. A voltage plateau corresponding to this phase change is 3.97 V. When x<0.78, the initial hexagonal crystal system disappears, and only the secondary hexagonal crystal system exists. In this process, with continuous deintercalation of lithium ions, an oxygen-oxygen electrostatic repulsion of negative charges between adjacent $CoO_2$ layers increases, and consequently c keeps increasing. This process takes place until x approaches 0.5. When x<0.5, the secondary hexagonal crystal system starts to be transformed into a monoclinic crystal system. Within a range of x=0.5 to 0.46, the lithium cobalt oxide has a monoclinic crystal system. When x approaches 0.46, the monoclinic crystal system is transformed again into a hexagonal crystal system. The reason for this transformation is rearrangement of lithium ions in a lithium layer. This transformation corresponds to a voltage plateau of 4.08 V and 4.15 V. An original layered structure in FIG. 3(b) is twisted and a c axis index changes. When x<0.46, after a voltage exceeds 4.2 V, as lithium deintercalation continues, the c axis index of the hexagonal crystal system starts to decrease rapidly. When x=0.22, the hexagonal crystal system starts to be transformed again into a secondary monoclinic crystal system. Subsequently, when x=0.22 to 0.18, in this range, two phases of the hexagonal crystal system and the secondary monoclinic crystal system coexist. In this case, a corresponding voltage plateau is 4.55 V. The transformation between the two phases reaches a climax when x=0.148. As lithium ions continue to leave, the hexagonal crystal system continues to be transformed into the secondary monoclinic crystal system. Subsequently, $Li_xCoO_2$ undergoes frequent phase changes, and a phrase range of a secondary monoclinic crystal system appears. The secondary monoclinic crystal system becomes transformed into the hexagonal crystal system as x decreases, until all lithium ions are deintercalated, and the structure turns into single-layered $CoO_2$. A $CoO_2$ structure generated through phase changes may be seen in FIG. 3(c). After multiple times of charging and discharging, a fracture starts to appear on a $Li_xCoO_2$ layer (FIG. 3(d)), and many fractured crystal particles appear on a side near an electrolyte (FIG. 3(e)). This is because a cobalt layer that is in contact with the electrolyte is decomposed and a lattice is collapsed.

A technical focus of developing a lithium cobalt oxide positive electrode material is to prevent a process of frequent phase changes of lithium cobalt oxide having a layered structure at a high voltage and in a state of deep lithium deintercalation as well as damage of materials that is caused by stress generated in a process of a phase change, and in addition, in the state of deep lithium deintercalation, to prevent a strong oxidizing property of 4-valent cobalt ions transformed from 3-valent cobalt ions in lithium cobalt oxide for a carbonate ester solvent as well as dissolution of cobalt ions in an electrolytic solution. Therefore, it becomes one of current development trends of batteries to develop a lithium cobalt oxide positive electrode material in a scenario of high-voltage use.

Figure 4:
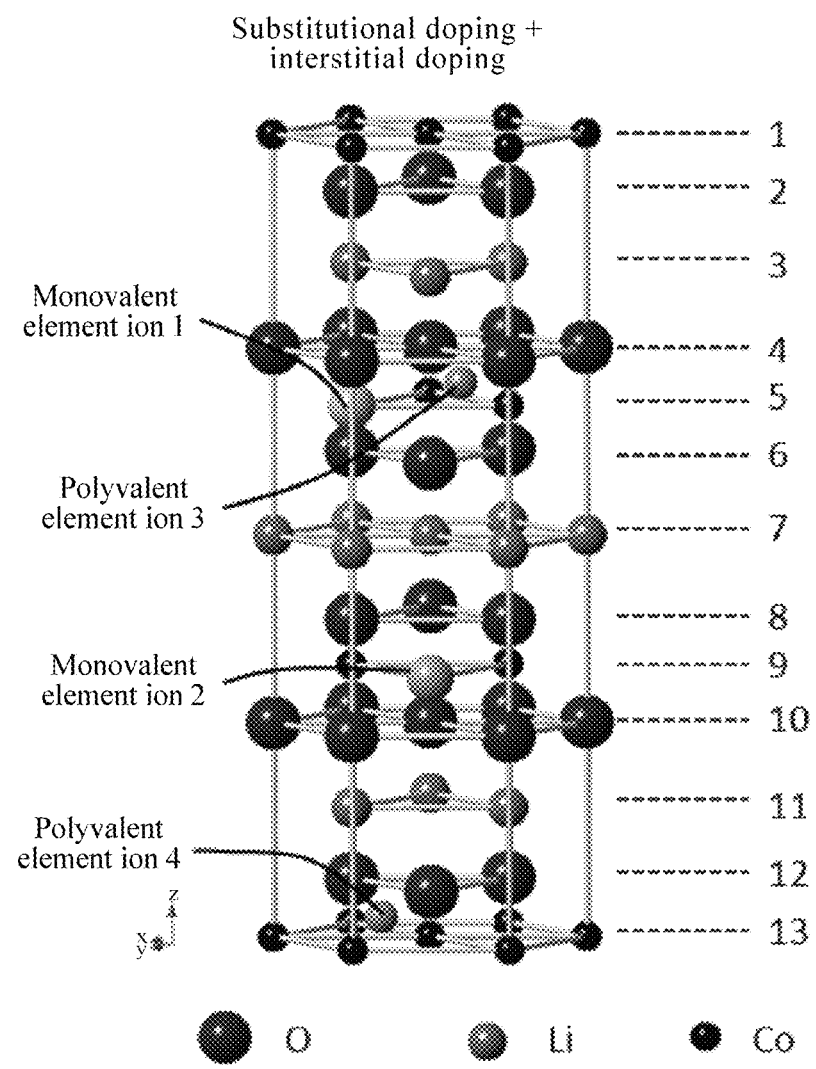
FIG. 4 is a schematic diagram of substitutional doping and interstitial doping in a layered structure of lithium cobalt oxide.

For the foregoing problem, the present application provides element doping for lithium cobalt oxide in which two forms of doping coexist. In one form, in a manner of substitutional doping, a monovalent element substitutes for a cobalt ion in a main sheet of a lattice structure of a lithium cobalt oxide. On one hand, during charging of lithium cobalt oxide, $Co^{3+}$ is oxidized into $Co^{4+}$, and an ionic radius changes, resulting in an unstable structure of the main sheet. On the other hand, in a strongly oxidizing atmosphere of contact with an electrolytic solution, cobalt ions are dissolved. This further impairs the structure of the main sheet. In a manner of substitutional doping, a monovalent element substitutes for a cobalt ion in a main sheet of a lattice structure of lithium cobalt oxide. On one hand, it may be ensured that a framework and a cobalt position of a layered structure do not mutate due to oxidation, so as to keep a lithium-ion transport channel stable. On the other hand, valence states of these monovalent element ions in cobalt positions do not change, and ionic radii also do not change, so as to keep the layered structure of the lithium cobalt oxide stable. FIG. 4 schematically shows a manner of substitutional doping of a monovalent element ion. It may be seen that in a $CoO_2$ main sheet formed of cobalt and oxygen, an oxygen layer, a cobalt layer, an oxygen layer are sequentially arranged (for example, the fourth layer to the sixth layer or the eighth layer to the tenth layer in FIG. 4). A monovalent element ion enters a cobalt layer to replace one cobalt ion in the cobalt layer to form substitutional doping. Because the monovalent element ion has an ionic radius different from that of the original cobalt ion, an interlayer distance in the layered structure of lithium cobalt oxide changes. Therefore, when a monovalent element is selected, a factor of an ionic radius needs to be fully considered. When a doped ion and an ion that is replaced with the doped ion have closer properties, lattice mutation caused by substitution is less severe.

In a lithium cobalt oxide system, an ionic radius of $Co^{3+}$ is 0.0685 nm, an ionic radius of $Li^+$ is 0.090 nm, and an ionic radius of $O^{2-}$ is 0.126 nm. Through comprehensive consideration of the foregoing information, in the present application, to stabilize a bulk structure, a range of an ionic radius of a doped monovalent element Ma ion is between 0.055 nm and 0.087 nm, and Ma may be selected from the following elements: Al ($Al^{3+}$, an ionic radius is 0.0675 nm), Ga ($Ga^{3+}$, an ionic radius is 0.076 nm), Hf ($Hf^{4+}$, an ionic radius is 0.085 nm), Mg ($Mg^{2+}$, an ionic radius is 0.086 nm), Sn ($Sn^{4+}$, an ionic radius is 0.083 nm), Zn ($Zn^{2+}$, an ionic radius is 0.088 nm), Zr ($Zr^{4+}$, an ionic radius is 0.086 nm), and the like. An ionic radius and a valence state of a doped element ion are close to those of $Co^{3+}$, and a doped element ion may substitute for a cobalt ion in the main sheet of the lattice structure of the lithium cobalt oxide, to ensure that a framework and a cobalt position of the layered structure do not mutate due to oxidation, so as to maintain the lithium-ion transport channel and improve stability of the layered structure of the positive electrode material.

In another form of doping, in a manner of interstitial doping, a polyvalent element is filled between a cobalt-ion layer and an oxygen-ion layer of a main sheet of a lattice structure of lithium cobalt oxide. FIG. 4 schematically shows a manner of interstitial doping of a polyvalent element ion. In FIG. 4, the polyvalent element ion is filled between a cobalt-ion layer and an oxygen-ion layer of the main sheet of the lattice structure of the lithium cobalt oxide. Specifically, the polyvalent element ion is filled in a tetrahedral space formed with one cobalt ion and three oxygen ions on an oxygen-ion layer being vertices, or, is filled in a tetrahedral space formed with one oxygen ion and three cobalt ions on a cobalt-ion layer being vertices. These doped polyvalent element ions and a $CoO_2$ main sheet with a negative charge are bonded through ionic bonding. On one hand, in an oxidizing atmosphere, the polyvalent element ion is oxidized prior to $Co^{3+}$, so that oxidation of $Co^{3+}$ is delayed. On the other hand, during oxidation of the polyvalent element, an ionic radius of the polyvalent element ion changes because of a loss of an electron, thereby increasing adaptability of a lattice, and mitigating or releasing stress caused by variation of a framework of a layered structure, so as to ensure that the framework of the layered structure is complete, and keep a lithium-ion transport channel stable.

For selection of a polyvalent element for interstitial doping, an ionic radius of the polyvalent element ion also needs to be close to a size of a cobalt ion, and the polyvalent element needs to have an oxidizing property stronger than that of $Co^{3+}$. A doped polyvalent element Mb may be selected from the following elements: Ni (having a valence state $Ni^{3+/4+}$), Mn (having a valence state $Mn^{3+/4+/5+/6+}$), V (having a valence state $V^{3+/4+/5+}$) Mo (having a valence state $Mo^{3+/4+/5+/6+}$), Nb (having a valence state $Nb^{3+/4+/5+}$), Cu (having a valence state $Cu^{2+/3+}$), Fe (having a valence state $Fe^{3+/4+/6+}$), In (having a valence state $In^{1+/3+}$), W (having a valence state $W^{4+/5+/6+}$), Cr (having a valence state $Cr^{2+/3+/4+/5+/6+}$), and the like. In a manner of interstitial doping, these elements are filled between a cobalt-ion layer and an oxygen-ion layer of the main sheet of the lattice structure of the lithium cobalt oxide, and are bonded to a $CoO_2$ main sheet with a negative charge through ionic bonding. In a strongly oxidizing atmosphere of an electrolytic solution, these elements are oxidized prior to $Co^{3+}$, and as a result, a valence state changes and an ionic radius changes, thereby releasing or mitigating stress caused by variation of a lattice size.

By means of doping the two types of elements in different manners, doped lithium cobalt oxide is obtained: $Li_{1+z}Co_{1-x-y}Ma_xMb_yO_2$ (generally, $0 \leq x \leq 0.01$, $0 \leq y \leq 0.01$, and $-0.05 \leq z \leq 0.08$; preferably, $0.0005 \leq x \leq 0.005$, $0.0005 \leq y \leq 0.005$, and $-0.01 \leq z \leq 0.03$). Ma is one or more of doped monovalent elements Al, Ga, Hf, Mg, Sn, Zn or Zr, and this type of doping is substitutional doping in which the element substitutes for the cobalt position. Mb is one or more of doped polyvalent elements Ni, Mn, V, Mo, Nb, Cu, Fe, In, W or Cr, and this type of doping is interstitial doping in which the element enters a lattice interstice of the lithium cobalt oxide.

Several possibilities of the prepared doped lithium cobalt oxide are listed below (but this patent is not merely limited to the possibilities shown below). The doped lithium cobalt oxide may be, but is not limited to, $LiCo_{0.996}Al_{0.003}Ni_{0.001}O_2$, $LiCo_{0.996}Al_{0.002}Ni_{0.002}O_2$, $Li_{1.02}Co_{0.995}Al_{0.004}Mn_{0.001}O_2$, $Li_{1.02}Co_{0.994}Al_{0.004}Mn_{0.002}O_2$, $Li_{1.03}Co_{0.995}Al_{0.004}Cr_{0.001}O_2$, and $Li_{1.03}Co_{0.994}Al_{0.004}Cr_{0.002}O_2$.

The prepared doped lithium cobalt oxide is doped with different elements. As a result, an interlayer distance of a lattice of the lithium cobalt oxide changes. For example, the monovalent element in FIG. 4 substitutes for a cobalt position. If a radius of a monovalent element ion is greater than that of a cobalt ion, as a result, an interlayer distance increases. When a polyvalent element ion is doped between a cobalt layer and an oxygen layer, as a result, an interlayer distance definitely increases. The increase of the interlayer distance is reflected by a variation of a c-axis size in the lattice structure. A Bruker D8 advance X-ray diffractometer is used to measure the c-axis size of the doped lithium cobalt oxide. A variation range of the c-axis size is 14.055 Å to 14.095 Å (a c-axis size is 14.052 Å when lithium cobalt oxide is not doped) or 0.02% to 0.3%.

The present application further provides a modified structure of surface coating of doped lithium cobalt oxide. A surface coating layer includes an inorganic solid electrolytic material or a high-voltage active material. Both substitutional doping and interstitial doping are to stabilize a layered structure of lithium cobalt oxide, so as to avoid frequent transformation of lithium cobalt oxide between a layered hexagonal crystal system and a spinel monoclinic crystal system. Through surface coating for a lithium cobalt oxide material, a side reaction between an electrolytic solution and lithium cobalt oxide may be reduced to reduce a polarization effect, so as to inhibit chemical reaction and cobalt dissolution, thereby ensuring stability of the layered structure of the lithium cobalt oxide. The side reaction between the electrolytic solution and the lithium cobalt oxide occurs because ions or electrons concentrate at an interface between the electrolytic solution and the active material, direct contact between the electrolytic solution and high-concentration 4-valent cobalt ions on a positive electrode surface causes a decomposition reaction and results in dissolution of cobalt ions in the electrolytic solution and release of gas.

The surface coating may be performed by using a dry method or a wet method. A coating substance needs to have desirable stability, that is, does not dissolve in an electrolytic solution system, is stable at a relatively high electric potential, and further has desirable electrical conductivity of electrons and lithium ions, so as to facilitate conduction of electrons in an electrode and diffusion of lithium ions, reduce a polarization effect at an interface, and prevent direct contact between an electrolytic solution and high-concentration 4-valent cobalt ions on a positive electrode surface to cause a decomposition reaction and result in dissolution of cobalt ions in the electrolytic solution, thereby stabilizing the structure after lithium deintercalation and improving electrochemical performance of lithium cobalt oxide. In the present application, to achieve the foregoing objective, a material used for a surface coating layer is $Li_{\gamma 1}Mc_{\gamma 2}O_{\gamma 3}$, including an inorganic solid electrolytic material or a high-voltage active material. Mc is one or more of Cr, Co, Ni, Cu, Mn, Ti, Zr, Hf, La, Nb, In, W, Ta, Ba, Te, Y, Sb, or P. $\gamma 1$, $\gamma 2$, and $\gamma 3$ may be any positive numbers but need to satisfy valence distribution. There may be several choices of Mc.

Several possible forms of the surface coating layer are listed below: $Li_2MgTiO_4$, $LiLaTiO_4$, $Li_6La_3Zr_{1.5}W_{0.5}O_{12}$, $Li_{7.06}La_3Zr_{1.94}Y_{1.06}O_{12}$, $LiNiMnO_4$, $LiCo_{0.5}Ni_{0.5}O_2$, $LiCoPO_4$, $LiNiPO_4$, $Li_{1+x}(Ni_{0.5}Mn_{0.5})_{1-x}O_2$ ($0 \leq x \leq 0.06$), $Li_{1+x}(Ni_zCo_{1-2z}Mn_z)_{1-x}O_2$ ($0 \leq x \leq 0.06$, and $0 \leq z \leq 0.5$), and the like.

By means of the two doping manners and the surface coating, a doped and surface coating co-modified lithium cobalt oxide positive electrode material $\alpha Li_{\gamma 1}Mc_{\gamma 2}O_{\gamma 3} \cdot \beta Li_{1+z}Co_{1-x-y}Ma_xMb_yO_2$ is eventually prepared (generally, $0 \leq \alpha \leq 0.08$, $0.92 \leq \beta \leq 1$, $0 \leq x \leq 0.01$, $0 \leq y \leq 0.01$, and $-0.05 \leq z \leq 0.08$; preferably, $0 \leq \alpha \leq 0.05$, $0.95 \leq \beta \leq 1$, $0.0005 \leq x \leq 0.005$, $0.0005 \leq y \leq 0.005$, and $-0.01 \leq z \leq 0.03$), so that the modified lithium cobalt oxide positive electrode material can work at 4.45 V and a higher voltage, so as to satisfy a battery requirement.

In an embodiment of the present application, a method for preparing a doped and surface coating co-modified lithium cobalt oxide positive electrode material is further provided. The method includes the following steps.

Step (1): By using a controlled crystallization method and according to a mole ratio, take a suitable amount of a cobalt source and a suitable amount of a compound containing a monovalent element Ma, prepare an aqueous solution containing Co ions and monovalent element Ma ions, mix the aqueous solution, a complexing agent solution, and a precipitating agent solution, so that the aqueous solution, the complexing agent solution, and the precipitating agent solution react and crystallize, perform stirring at the same time, control a pH value of a reaction system to be 6 to 12, and perform centrifugal filtering after crystallization, to obtain a monovalent element Ma-doped cobalt carbonate or hydroxide.

Step (2): According to a mole ratio, take a suitable amount of a compound containing a polyvalent element Mb, stir the compound and the monovalent element Ma-doped cobalt carbonate or hydroxide obtained after step (1) to obtain a homogeneous mixture, place the mixture in a muffle furnace or a sintering furnace to perform temperature sintering, and then perform comminution processing on a resultant to obtain an Ma-Mb codoped Co oxide precursor.

Step (3): According to a mole ratio, mix and grind the Ma-Mb codoped Co oxide precursor obtained after step (2) and a lithium source into a homogeneous mixture, place the mixture in the muffle furnace or the sintering furnace to perform temperature sintering, and then perform comminution processing on a resultant, to obtain an Ma-Mb codoped doped lithium cobalt oxide $Li_{1+z}Co_{1-x-y}Ma_xMb_yO_2$ (generally, $0 \le x \le 0.01$, $0 \le y \le 0.01$, and $-0.05 \le z \le 0.08$; preferably, $0.0005 \le x \le 0.005$, $0.0005 \le y \le 0.005$, and $-0.01 \le z \le 0.03$).

Step (4): By using a solid-phase coating synthesis method and according to a mole ratio, stir the lithium source, a compound containing an element Mc, and the doped lithium cobalt oxide $Li_{1+z}Co_{1-x-y}Ma_xMb_yO_2$ obtained after step (3) to obtain a homogeneous mixture, place the mixture in the muffle furnace or the sintering furnace to perform temperature sintering, and then perform comminution processing on a resultant, to obtain a bulk doped and surface coating co-modified lithium cobalt oxide positive electrode material $\alpha Li_{y1}Mc_{y2}O_{y3} \cdot \beta Li_{1+z}Co_{1-x-y}Ma_xMb_yO_2$ (generally, $0 \le \alpha \le 0.08$, and $0.92 \le \beta \le 1$; preferably, $0 \le \alpha \le 0.05$, and $0.95 \le \beta \le 1$).

In addition, step (4) may be replaced with: by using a liquid-phase coating synthesis method and according to a mole ratio, stir the lithium source, the compound containing the element Mc, and the doped lithium cobalt oxide $Li_{1+z}Co_{1-x-y}Ma_xMb_yO_2$ obtained after step (3) to obtain a homogeneous mixture, after a powder is dried, place the mixture in the muffle furnace or the sintering furnace to perform temperature sintering, and then perform comminution processing on a resultant, to obtain a bulk doped and surface coating co-modified lithium cobalt oxide positive electrode material $\alpha Li_{y1}Mc_{y2}O_{y3} \cdot \beta Li_{1+z}Co_{1-x-y}Ma_xMb_yO_2$ (generally, $0 \le \alpha \le 0.08$, and $0.92 \le \beta \le 1$; preferably, $0 \le \alpha \le 0.05$, and $0.95 \le \beta \le 1$).

In one embodiment, in step (1), the cobalt source is one or more of cobalt acetate, cobalt oxalate, cobalt nitrate, cobalt sulfate, or cobalt chloride.

In one embodiment, in step (1), the monovalent element Ma is one or more of Al, Ga, Hf, Mg, Sn, Zn, or Zr.

In one embodiment, in step (1), the compound containing the monovalent element Ma is selected from one or more of a nitrate, an oxalate, an acetate, a fluoride, a chloride, a sulfate, or the like containing Ma; The compound containing the monovalent element Ma also may be selected from one or more of a sulfate, a nitrate, or an acetate containing Ma, for example, aluminum oxalate, aluminum nitrate, magnesium oxalate, magnesium nitrate, zirconium oxalate, zirconium nitrate, zinc oxalate, zinc nitrate, gallium nitrate, gallium fluoride, or tin sulfide.

In one embodiment, in step (1), a concentration of the Co ions in the aqueous solution containing the Co ions and the monovalent element Ma ions is 0.5 mol/L to 2.0 mol/L; further optionally, the concentration of the Co ions in the aqueous solution containing the Co ions and the monovalent element Ma ions is 0.8 mol/L to 1.5 mol/L.

In one embodiment, in step (1), the precipitating agent solution is a strong base solution, a carbonate solution, or an oxalic acid or oxalate solution.

In one embodiment, in step (1), the complexing agent solution is an ammonia solution or a solution of aminooxyacetic acid salt.

In one embodiment, in step (1), when the aqueous solution containing the Co ions and the monovalent element Ma ions is mixed with the precipitating agent solution, a manner of parallel flow control is used for mixing, where a speed of the parallel flow control does not exceed 200 L/h, a stirring speed does not exceed 200 rpm, and a crystallization temperature does not exceed 100° C.

In one embodiment, in step (1), the crystallization is 4 times to 8 times of repeated crystallization by means of continuous reactions.

In one embodiment, in step (2), the polyvalent element Mb is one or more of Ni, Mn, V, Mo, Nb, Cu, Fe, In, W, or Cr; and/or In one embodiment, in step (2), the compound containing the polyvalent element Mb is selected from one or more of an oxide, a hydroxide, a carbonate, a nitrate, an oxalate, an acetate, or the like containing Mb; further optionally, the compound containing the polyvalent element Mb is selected from one or more of a nitrate, or an acetate containing Mb, for example, nickel nitrate, nickel oxide, nickel hydroxide, nickel oxide hydroxide, nickel carbonate, nickel oxalate, manganese oxide, manganese carbonate, manganese oxalate, manganese nitrate, molybdenum oxide, molybdenum hydroxide, molybdenum carbonate, molybdenum oxalate, molybdenum nitrate, niobium oxide, niobium hydroxide, niobium oxalate, niobium nitrate, copper oxide, copper hydroxide, copper nitrate, copper acetate, copper chloride, iron oxide, iron hydroxide, iron nitrate, iron oxalate, iron chloride, indium oxide, indium hydroxide, indium chloride, tungsten oxide, tungsten fluoride, chromium oxide, chromium hydroxide, chromium carbonate, chromium oxalate, or chromium nitrate.

In one embodiment, in step (2), a temperature of the temperature sintering is 800° C. to 1000° C., and a sintering time is 4 h to 10 h; further optionally, the temperature of the temperature sintering is 900° C. to 950° C., and the sintering time is 6 h to 8 h.

In one embodiment, in step (3), the lithium source is selected from a compound containing lithium and a combination thereof, and may be selected from one or more of lithium hydroxide, lithium nitrate, lithium carbonate, lithium oxalate, lithium acetate, lithium oxide, or lithium citrate; further optionally, the lithium source may be selected from lithium carbonate and lithium hydroxide.

In one embodiment, in step (3), a temperature of the temperature sintering is 950° C. to 1100° C., a sintering time is 8 h to 16 h; further optionally, the temperature of the temperature sintering is 1020° C. to 1080° C., and the sintering time is 10 h to 14 h.

In one embodiment, in step (4), the element Mc is one or more of Cr, Co, Ni, Cu, Mn, Ti, Zr, Hf, La, Nb, In, W, Ta, Ba, Te, Y, Sb, or P.

In one embodiment, in step (4), the compound containing the element Mc is one or more of an oxide, a hydroxide, a carbonate, a nitrate, an oxalate, an acetate, or the like containing Mc.

In one embodiment, in step (4), a temperature of the temperature sintering is 850° C. to 1050° C., and a sintering time is 8 h to 16 h; further optionally, the temperature of the temperature sintering is 900° C. to 1000° C., and the sintering time is 10 h to 14 h.

In the foregoing preparation method, by using the controlled crystallization method, the monovalent element and the cobalt source are homogeneously distributed in a liquid system, so that doped elements are homogeneously distributed, reactions are complete, and a formed crystal has a stable structure. During the temperature sintering in step (2) of the mixture of the resultant in step (1) and the polyvalent element, a resultant having a loose structure in step (1) is contracted into a closely melted doped precursor $Co_3O_4$ having a stable structure, a monovalent element ion that is more stable than a cobalt ion occupies a cobalt position, so that structural stability of the precursor $Co_3O_4$ is enhanced. In addition, during the temperature sintering, a polyvalent element ion has higher energy and can enter interstices of a lattice structure to form interstitial doping, so as to exert an effect of buffering or releasing stress during high voltage cycling and stabilize a crystal structure.

In a strongly oxidizing atmosphere during charging and discharging, $Co^{3+}$ is oxidized into $Co^{4+}$ and dissolution occurs. A valence state of the monovalent element ion does not change at a cobalt position, so as to keep a lithium-ion transport channel and a layered structure of lithium cobalt oxide stable. The polyvalent element ion enters cobalt and oxygen interstices by means of interstitial doping and is bonded to a $CoO_2$ main sheet with a negative charge through ionic bonding. On one hand, in an oxidizing atmosphere, the polyvalent element ion is oxidized prior to $Co^{3+}$, so that oxidation of $Co^{3+}$ is delayed. On the other hand, during oxidation of the polyvalent element, an ionic radius of the polyvalent element ion changes because of a loss of an electron, thereby increasing adaptability of a lattice, and mitigating or releasing stress caused by variation of a framework of the layered structure, so as to ensure that the framework of the layered structure is complete, and keep the lithium-ion transport channel stable.

In another embodiment, a method for preparing a doped and surface coating co-modified lithium cobalt oxide positive electrode material is further provided. The method includes the following steps.

Step (1): By using a controlled crystallization method and according to a mole ratio, take a suitable amount of a cobalt source and a suitable amount of a compound containing a monovalent element Ma, prepare an aqueous solution containing Co ions and monovalent element Ma ions, mix the aqueous solution, a complexing agent solution, and a precipitating agent solution, so that the aqueous solution, the complexing agent solution, and the precipitating agent solution react and crystallize, perform stirring at the same time, control a pH value of a reaction system to be 6 to 12, and perform centrifugal filtering after crystallization, to obtain a monovalent element Ma-doped cobalt carbonate or hydroxide.

Step (2): Perform temperature decomposition on the monovalent element Ma-doped cobalt carbonate or hydroxide obtained after step (1), and then perform comminution processing on a resultant of the decomposition, to obtain a monovalent element Ma-doped precursor $Co_3O_4$; according to a mole ratio, take a suitable amount of a compound containing a polyvalent element Mb, stir the compound, the monovalent element Ma-doped precursor $Co_3O_4$, and a lithium source to obtain a homogeneous mixture, place the mixture in a muffle furnace or a sintering furnace to perform temperature sintering, and then perform comminution processing on a resultant, to obtain an Ma-Mb codoped doped lithium cobalt oxide $Li_{1+z}Co_{1-x-y}Ma_xMb_yO_2$ (generally, $0 \leq x \leq 0.01$, $0 \leq y \leq 0.01$, and $-0.05 \leq z \leq 0.08$; preferably, $0.0005 \leq x \leq 0.005$, $0.0005 \leq y \leq 0.005$, and $-0.01 \leq z \leq 0.03$).

Step (3): By using a solid-phase coating synthesis method and according to a mole ratio, stir the lithium source, a compound containing an element Mc, and the doped lithium cobalt oxide $Li_{1+z}Co_{1-x-y}Ma_xMb_yO_2$ obtained after step (2) to obtain a homogeneous mixture, place the mixture in the muffle furnace or the sintering furnace to perform temperature sintering, and then perform comminution processing on a resultant, to obtain a doped and surface coating co-modified lithium cobalt oxide positive electrode material $\alpha Li_{y1}Mc_{y2}O_{y3} \cdot \beta Li_{1+z}Co_{1-x-y}Ma_xMb_yO_2$ (generally, $0 < \alpha \leq 0.08$, and $0.92 \leq \beta \leq 1$; preferably, $0 < \alpha \leq 0.05$, and $0.95 \leq \beta \leq 1$).

It should be pointed out that step (3) may be replaced with: by using a liquid-phase coating synthesis method and according to a mole ratio, stir the lithium source, the compound containing the element Mc, and the doped lithium cobalt oxide $Li_{1+z}Co_{1-x-y}Ma_xMb_yO_2$ obtained after step (2) to obtain a homogeneous mixture, after a powder is dried, place the mixture in the muffle furnace or the sintering furnace to perform temperature sintering, and then perform comminution processing on a resultant, to obtain a doped and surface coating co-modified lithium cobalt oxide positive electrode material $\alpha Li_{y1}Mc_{y2}O_{y3} \cdot \beta Li_{1+z}Co_{1-x-y}Ma_xMb_yO_2$ (generally, $0 < \alpha \leq 0.08$, and $0.92 \leq \beta \leq 1$; optionally, $0 < \alpha \leq 0.05$, and $0.95 \leq \beta \leq 1$).

In one embodiment, in step (1), the cobalt source is one or more of cobalt acetate, cobalt oxalate, cobalt nitrate, cobalt sulfate, or cobalt chloride.

In one embodiment, in step (1), the monovalent element Ma is one or more of Al, Ga, Hf, Mg, Sn, Zn, or Zr.

In one embodiment, in step (1), the compound containing the monovalent element Ma is selected from one or more of a nitrate, an oxalate, an acetate, a fluoride, a chloride, a sulfate, or the like containing Ma; further optionally, the compound containing the monovalent element Ma is selected from one or more of a sulfate, a nitrate, or an acetate containing Ma, for example, aluminum oxalate, aluminum nitrate, magnesium oxalate, magnesium nitrate, zirconium oxalate, zirconium nitrate, zinc oxalate, zinc nitrate, gallium nitrate, gallium fluoride, or tin sulfide.

In one embodiment, in step (1), a concentration of the Co ions in the aqueous solution containing the Co ions and the monovalent element Ma ions is 0.5 mol/L to 2.0 mol/L; further optionally, the concentration of the Co ions in the aqueous solution containing the Co ions and the monovalent element Ma ions is 0.8 mol/L to 1.5 mol/L.

In one embodiment, in step (1), the precipitating agent solution is a strong base solution, a carbonate solution, or an oxalic acid or oxalate solution.

In one embodiment, in step (1), the complexing agent solution is an ammonia solution or a solution of aminooxyacetic acid salt.

In one embodiment, in step (1), when the aqueous solution containing the Co ions and the monovalent element Ma ions is mixed with the precipitating agent solution, a manner of parallel flow control is used for mixing, where a speed of the parallel flow control does not exceed 200 L/h, a stirring speed does not exceed 200 rpm, and a crystallization temperature does not exceed 100° C.

In one embodiment, in step (1), the crystallization is 4 times to 8 times of repeated crystallization by means of continuous reactions.

In one embodiment, in step (2), the polyvalent element Mb is one or more of Ni, Mn, V, Mo, Nb, Cu, Fe, In, W, or Cr.

In one embodiment, in step (2), the compound containing the polyvalent element Mb is selected from one or more of an oxide, a hydroxide, a carbonate, a nitrate, an oxalate, an acetate, or the like containing Mb; further optionally, the compound containing the polyvalent element Mb is selected from one or more of a nitrate, or an acetate containing Mb, for example, nickel nitrate, nickel oxide, nickel hydroxide, nickel oxide hydroxide, nickel carbonate, nickel oxalate, manganese oxide, manganese carbonate, manganese oxalate, manganese nitrate, molybdenum oxide, molybdenum hydroxide, molybdenum carbonate, molybdenum oxalate, molybdenum nitrate, niobium oxide, niobium hydroxide, niobium oxalate, niobium nitrate, copper oxide, copper hydroxide, copper nitrate, copper acetate, copper chloride, iron oxide, iron hydroxide, iron nitrate, iron oxalate, iron chloride, indium oxide, indium hydroxide, indium chloride, tungsten oxide, tungsten fluoride, chromium oxide, chromium hydroxide, chromium carbonate, chromium oxalate, or chromium nitrate.

In one embodiment, in step (2), a temperature of the temperature sintering is 800° C. to 1000° C., and a sintering time is 4 h to 10 h; further optionally, the temperature of the temperature sintering is 900° C. to 950° C., and the sintering time is 6 h to 8 h.

In one embodiment, in step (3), the element Mc is one or more of Cr, Co, Ni, Cu, Mn, Ti, Zr, Hf, La, Nb, In, W, Ta, Ba, Te, Y, Sb, or P.

In one embodiment, in step (3), the compound containing the element Mc is one or more of an oxide, a hydroxide, a carbonate, a nitrate, an oxalate, an acetate, or the like containing Mc.

In one embodiment, in step (3), a temperature of the temperature sintering is 850° C. to 1050° C., and a sintering time is 8 h to 16 h; further optionally, the temperature of the temperature sintering is 900° C. to 1000° C., and the sintering time is 10 h to 14 h.

The present application is further described below in detail with reference to embodiments, but implementations of the present application are not limited thereto.

Embodiment 1

A lithium cobalt oxide positive electrode material is formed by doping lithium cobalt oxide with Al and Ni and coating the doped lithium cobalt oxide with $Li_2MgTiO_4$. A molecular formula of the lithium cobalt oxide positive electrode material is $0.005Li_2MgTiO_4 \cdot 0.995LiCo_{0.996}Al_{0.003}Ni_{0.001}O_2$. A method for preparing same includes the following steps.

(1) Dissolve $CoSO_4$ and $Al_2(SO_4)_3$ by using deionized water, and prepare a mixed salt solution with a mole ratio Co:Al=99.6:0.3, where a concentration of $Co^{2+}$ in the mixed salt solution is 1.25 mol/L; prepare a complexing agent solution by using a strong ammonia solution and distilled water at a volume ratio of 1:10; use a sodium carbonate solution of 1.2 mol/L as a precipitating agent solution; inject the precipitating agent solution whose volume is 1/3 of the volume of a reaction kettle in the reaction kettle, under an effect of intense stirring and protection of an inert gas, use a manner of parallel flow control to continue to inject the mixed salt solution, the complexing agent solution, and the precipitating agent solution in the reaction kettle at the same time to enable the mixed salt solution, the complexing agent solution, and the precipitating agent solution to react, where a speed of the parallel flow control does not exceed 200 L/h, perform stirring at the same time, where a stirring speed does not exceed 200 rpm, control a pH value of a reaction system to be 6 to 12, and during reactions, control a temperature of the reaction kettle to be between 70° C. and 80° C.; during reactions, monitor in real time liquid phase ion concentrations of doped elements Al and Co in the reaction system; and perform 4 times of repeated crystallization by means of continuous reactions, and then perform centrifugal filtering, to obtain an Al-doped precursor cobalt salt.

(2) According to a mole ratio Co:Ni=99.6:0.1, weigh particular amounts of nickel acetate and the Al-doped precursor cobalt salt obtained after step (1), stir the nickel acetate and the Al-doped precursor cobalt salt to obtain a homogeneous mixture, place the mixture in a muffle furnace to sinter the mixture at 900° C. for 8 h, and then perform comminution processing on a sintered resultant, to obtain an Al—Ni codoped $Co_3O_4$ precursor with homogeneously distributed particles.

(3) According to a mole ratio Li:Co=100:99.6, weigh particular amounts of lithium carbonate and the Al—Ni codoped $Co_3O_4$ precursor obtained after step (2), stir the lithium carbonate and the Al—Ni codoped $Co_3O_4$ precursor to obtain a homogeneous mixture, place the mixture in the muffle furnace to sinter the mixture at 1050° C. for 12 h, and then perform comminution processing on a sintered resultant, to obtain Al—Ni codoped lithium cobalt oxide $LiCo_{0.996}Al_{0.003}Ni_{0.001}O_2$ with homogeneously distributed particles.

(4) According to a mole ratio Li:Mg:Ti: $LiCo_{0.996}Al_{0.003}Ni_{0.001}O_2$=0.25:0.5:0.5:99.5, weigh particular amounts of lithium carbonate, magnesium oxide, titanium oxide, and $LiCo_{0.996}Al_{0.003}Ni_{0.001}O_2$ prepared after step (3), stir the lithium carbonate, the magnesium oxide, the titanium oxide, and $LiCo_{0.996}Al_{0.003}Ni_{0.001}O_2$ to obtain a homogeneous mixture, place the mixture in the muffle furnace to sinter the mixture at 950° C. for 12 h, then perform comminution processing on a sintered resultant, to obtain a doped and surface coating co-modified lithium cobalt oxide positive electrode material $0.005Li_2MgTiO_4 \cdot 0.995LiCo_{0.996}Al_{0.003}Ni_{0.001}O_2$.

Figure 5:
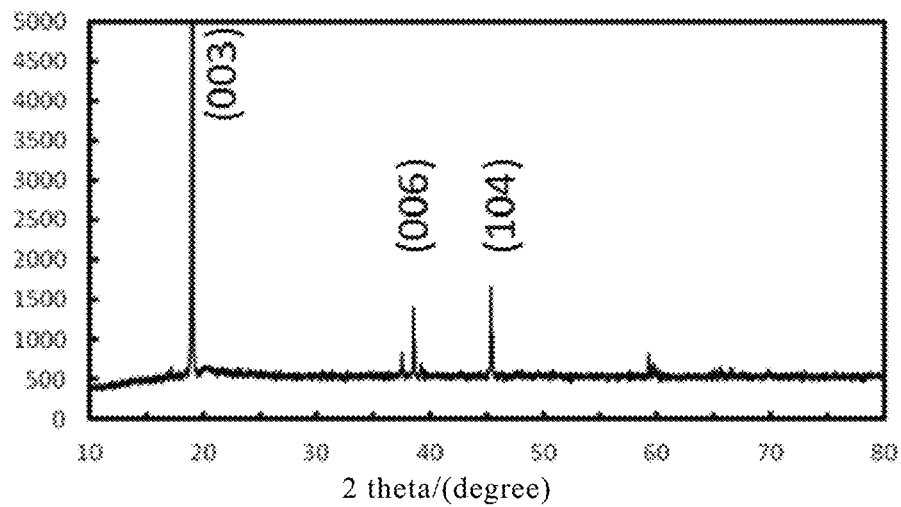
FIG. 5 is an X-ray diffraction pattern of a lithium cobalt oxide positive electrode material according to one embodiment.
Figure 6A:
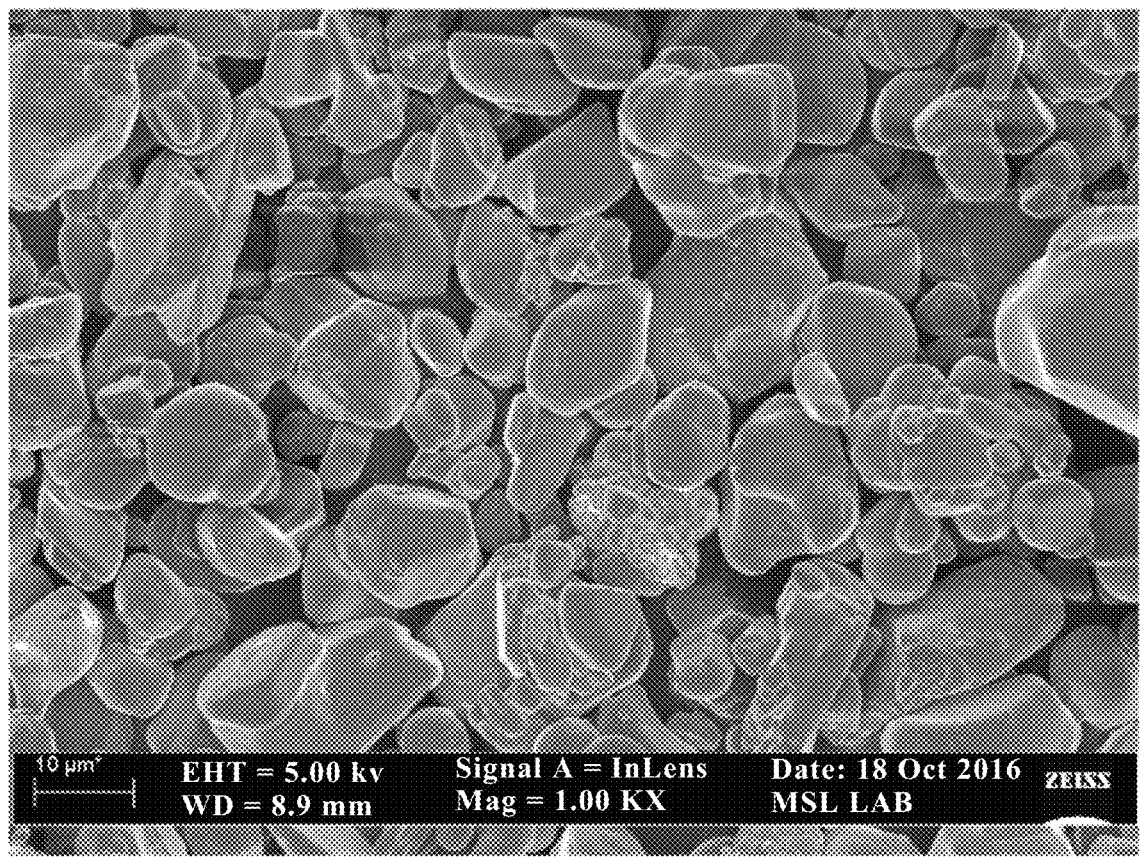
FIG. 6(a) is a Scanning Electron Microscope (SEM) image of a lithium cobalt oxide positive electrode material according to one embodiment.
Figure 6B:
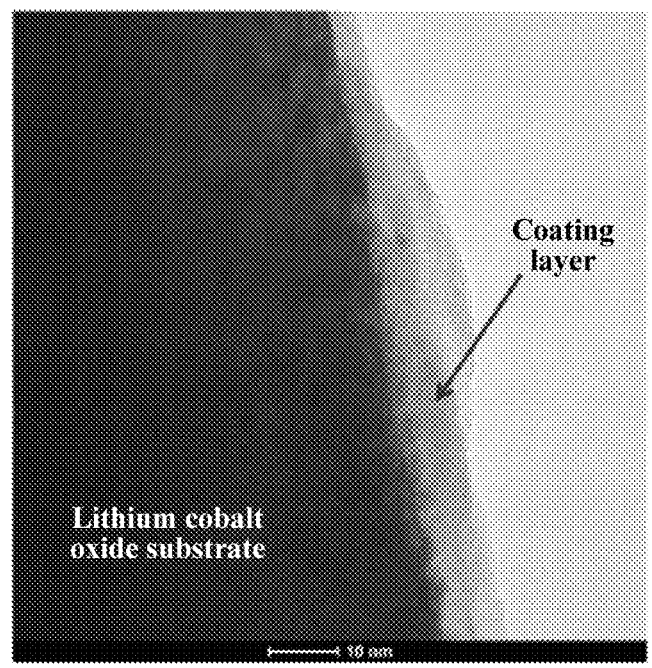
FIG. 6(b) is a Transmission Electron Microscope (TEM) image of a lithium cobalt oxide positive electrode material according to one embodiment.
Figure 7:
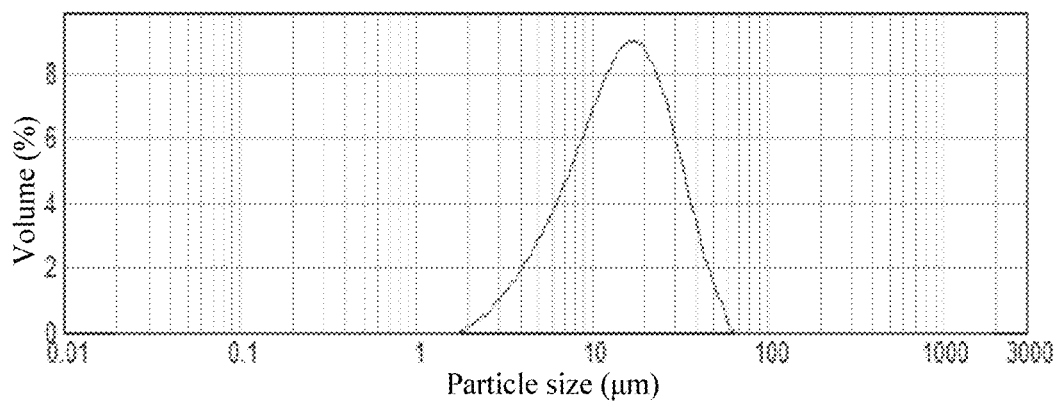
FIG. 7 shows granularity distribution of a lithium cobalt oxide positive electrode material according to one embodiment.
Figure 8:
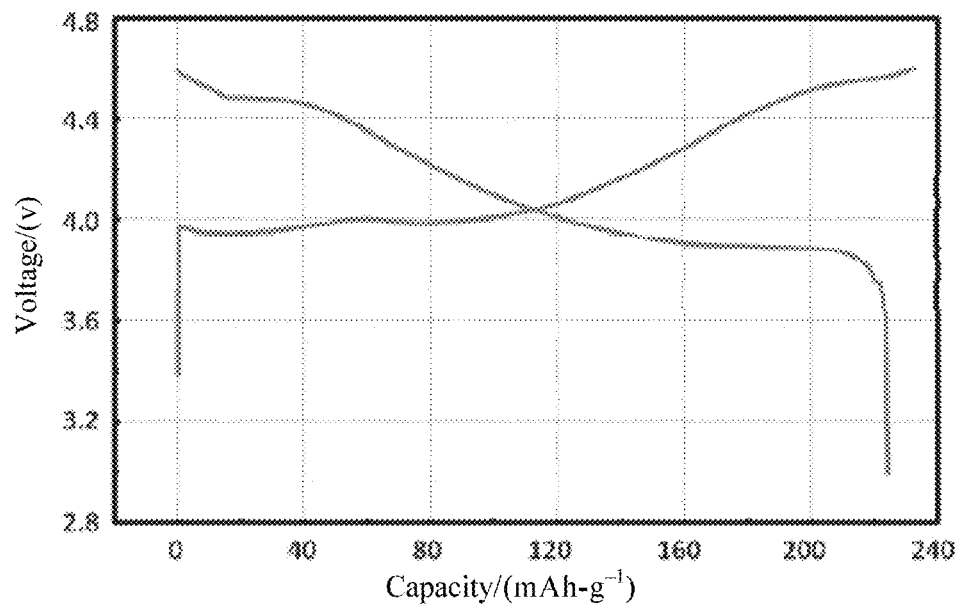
FIG. 8 is an initial charge and discharge curve of a lithium cobalt oxide positive electrode material according to one embodiment.
Figure 9:
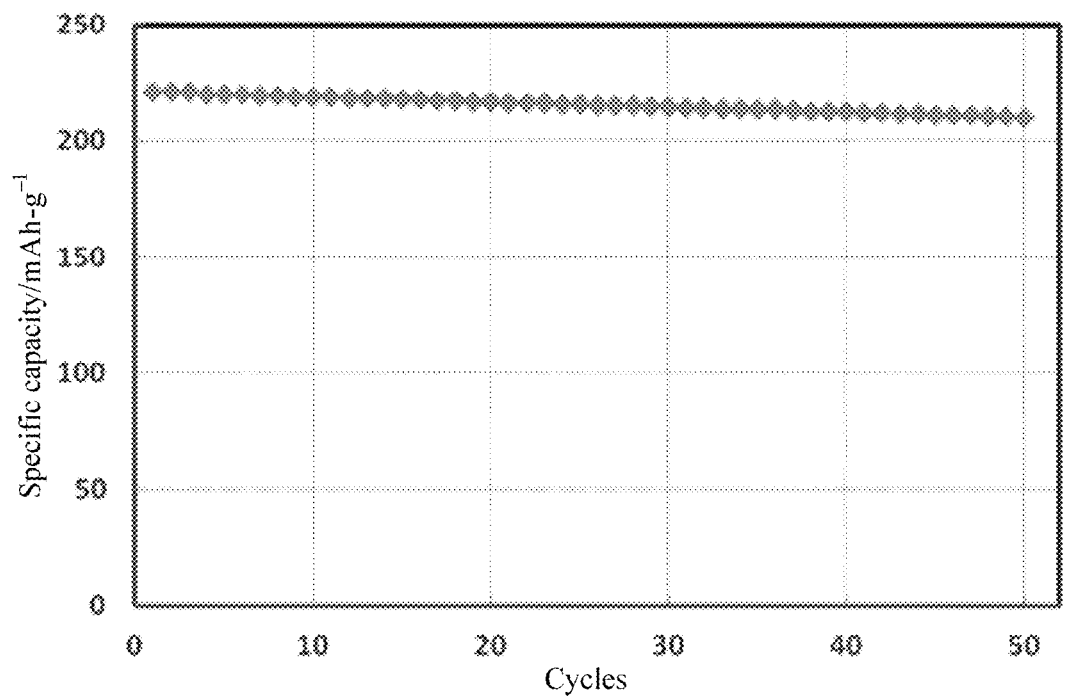
FIG. 9 is a cycling curve of a lithium cobalt oxide positive electrode material according to one embodiment.

Physical performance tests and constant-current charge and discharge tests are performed on the prepared lithium cobalt oxide positive electrode material $0.005Li_2MgTiO_4 \cdot 0.995LiCo_{0.996}Al_{0.003}Ni_{0.001}O_2$. For example, FIG. 5 is an X-ray diffraction pattern obtained by using a Bruker D8 Advance X-ray diffractometer. An interlayer distance, that is, a c-axis size of lithium cobalt oxide may be calculated by using a diffraction angle at a peak (003). A diffraction angle (2 theta) corresponding to the peak (003) in FIG. 5 is 18.91°, and it may be obtained by means of calculation that the c-axis size is 14.06 Å. FIG. 6(a) is a scanning electron microscope image of the prepared lithium cobalt oxide positive electrode material and FIG. 6(b) is a transmission electron microscope image of the prepared lithium cobalt oxide positive electrode material. It can be seen in FIG. 6(a) that the obtained lithium cobalt oxide positive electrode material is ellipsoidal particles with a smooth surface. A coating layer on an outer surface of the particle can be clearly seen in FIG. 6(b), and a thickness of the coating layer is approximately 10 nm. In this embodiment, the coating layer is $Li_2MgTiO_4$. FIG. 7 is a diagram of granularity distribution of the prepared lithium cobalt oxide positive electrode material. It can be seen that particle size distribution of the obtained lithium cobalt oxide positive electrode material is centralized, and D50 is 16 μm. FIG. 8 and FIG. 9 are an initial charge and discharge curve and a cycling curve of this positive electrode material. It can be learned according to shown test results that the positive electrode material under a condition of a room temperature, when a voltage range is 3.0 V to 4.6 V, the low-polarization high-voltage lithium cobalt oxide positive electrode material has an extremely high discharge specific capacity and excellent cycling stability. An initial discharge specific capacity reaches 224 mAh/g, and initial charge and discharge efficiency is 96.6%. After 50 cycles, a capacity retention ratio is greater than 95%. The material shows excellent cycling stability because of the following aspects: A monovalent element substitutes for a cobalt position by means of substitutional doping, and is not oxidized in a strongly oxidizing atmosphere, so as to keep a cobalt-oxygen main sheet stable and a lithium-ion transport channel smooth. By means of interstitial doping of a polyvalent element, on one hand, a polyvalent element ion is oxidized prior to $Co^{3+}$ in an oxidizing atmosphere, so that oxidation of $Co^{3+}$ is delayed. On the other hand, during oxidation of the polyvalent element ion, an ionic radius of the polyvalent element ion changes because of a loss of an electron, thereby increasing adaptability of a lattice, and mitigating or releasing stress caused by variation of a framework of a layered structure, so as to ensure that the framework of the layered structure is complete, and keep the lithium-ion transport channel stable.

Embodiment 2

A lithium cobalt oxide positive electrode material is formed by doping lithium cobalt oxide with Al and Cr and coating the doped lithium cobalt oxide with $LiLaTiO_4$. A molecular formula of the lithium cobalt oxide positive electrode material is $0.005LiLaTiO_4 \cdot 0.995Li_{1.03}Co_{0.995}Al_{0.004}Cr_{0.001}O_2$. A method for preparing same includes the following steps.

(1) Dissolve $CoSO_4$ and $Al_2(SO_4)_3$ by using deionized water, and prepare a mixed salt solution with a mole ratio Co:Al=99.5:0.4, where a concentration of $Co^{2+}$ in the mixed salt solution is 1.25 mol/L; prepare a complexing agent solution by using a strong ammonia solution and distilled water at a volume ratio of 1:10; use a sodium carbonate solution of 1.2 mol/L as a precipitating agent solution; inject the precipitating agent solution whose volume is ⅓ of the volume of a reaction kettle in the reaction kettle, under an effect of intense stirring and protection of an inert gas, use a manner of parallel flow control to continue to inject the mixed salt solution, the complexing agent solution, and the precipitating agent solution in the reaction kettle at the same time to enable the mixed salt solution, the complexing agent solution, and the precipitating agent solution to react, where a speed of the parallel flow control does not exceed 200 L/h, perform stirring at the same time, where a stirring speed does not exceed 200 rpm, control a pH value of a reaction system to be 6 to 12, and during reactions, control a temperature of the reaction kettle to be between 70° C. and 80° C.; during reactions, monitor in real time liquid phase ion concentrations of doped elements Al and Co in the reaction system; and perform 4 times of repeated crystallization by means of continuous reactions, and then perform centrifugal filtering, to obtain an Al-doped precursor cobalt salt.

(2) According to a mole ratio Co:Cr=99.5:0.1, weigh particular amounts of chromium oxide and the Al-doped precursor cobalt salt obtained after step (1), stir the chromium oxide and the Al-doped precursor cobalt salt to obtain a homogeneous mixture, place the mixture in a muffle furnace to sinter the mixture at 900° C. for 8 h, and then perform comminution processing on a sintered resultant, to obtain an Al—Cr codoped $Co_3O_4$ precursor with homogeneously distributed particles.

(3) According to a mole ratio Li:Co=103:99.5, weigh particular amounts of lithium carbonate and the Al—Cr codoped $Co_3O_4$ precursor obtained after step (2), stir the lithium carbonate and the Al—Cr codoped $Co_3O_4$ precursor to obtain a homogeneous mixture, place the mixture in the muffle furnace to sinter the mixture at 1050° C. for 12 h, and then perform comminution processing on a sintered resultant, to obtain Al—Cr codoped lithium cobalt oxide $Li_{0.03}Co_{0.995}Al_{0.004}Cr_{0.001}O_2$ with homogeneously distributed particles.

(4) According to a mole ratio Li:La:Ti: $Li_{0.03}Co_{0.995}Al_{0.004}Cr_{0.001}O_2$=0.5:0.5:0.5:99.5, weigh particular amounts of lithium carbonate, lanthanum oxide, titanium oxide, and $Li_{0.03}Co_{0.995}Al_{0.004}Cr_{0.001}O_2$ prepared after step (3), stir the lithium carbonate, the lanthanum oxide, the titanium oxide, and $Li_{1.03}Co_{0.995}Al_{0.004}Cr_{0.001}O_2$ to obtain a homogeneous mixture, place the mixture in the muffle furnace to sinter the mixture at 950° C. for 12 h, and then perform comminution processing on a sintered resultant, to obtain a doped and surface coating co-modified lithium cobalt oxide positive electrode material $0.005LiLaTiO_4 \cdot 0.995Li_{1.03}Co_{0.995}Al_{0.004}Cr_{0.001}O_2$.

Embodiment 3

A lithium cobalt oxide positive electrode material is formed by doping lithium cobalt oxide with Al and Ni and coating the doped lithium cobalt oxide with $LiCo_{0.5}Ni_{0.5}O_2$. A molecular formula of the lithium cobalt oxide positive electrode material is $0.005LiCo_{0.5}Ni_{0.5}O_2 \cdot 0.995LiCo_{0.996}Al_{0.003}Ni_{0.001}O_2$. A method for preparing same includes the following steps.

(1) Dissolve $CoSO_4$ and $Al_2(SO_4)_3$ by using deionized water, and prepare a mixed salt solution with a mole ratio Co:Al=99.6:0.3, where a concentration of $Co^{2+}$ in the mixed salt solution is 1.25 mol/L; prepare a complexing agent solution by using a strong ammonia solution and distilled water at a volume ratio of 1:10; use a sodium carbonate solution of 1.2 mol/L as a precipitating agent solution; inject the precipitating agent solution whose volume is ⅓ of the volume of a reaction kettle in the reaction kettle, under an effect of intense stirring and protection of an inert gas, use a manner of parallel flow control to continue to inject the mixed salt solution, the complexing agent solution, and the precipitating agent solution in the reaction kettle at the same time to enable the mixed salt solution, the complexing agent solution, and the precipitating agent solution to react, where a speed of the parallel flow control does not exceed 200 L/h, perform stirring at the same time, where a stirring speed does not exceed 200 rpm, control a pH value of a reaction system to be 6 to 12, and during reactions, control a temperature of the reaction kettle to be between 70° C. and 80° C.; during reactions, monitor in real time liquid phase ion concentrations of doped elements Al and Co in the reaction system; and perform 4 times of repeated crystallization by means of continuous reactions, and then perform centrifugal filtering, to obtain an Al-doped precursor cobalt salt;

(2) According to a mole ratio Co:Ni=99.6:0.1, weigh particular amounts of nickel acetate and the Al-doped precursor cobalt salt obtained after step (1), stir the nickel acetate and the Al-doped precursor cobalt salt to obtain a homogeneous mixture, place the mixture in a muffle furnace to sinter the mixture at 900° C. for 8 h, and then perform comminution processing on a sintered resultant, to obtain an Al—Ni codoped $Co_3O_4$ precursor with homogeneously distributed particles.

(3) According to a mole ratio Li:Co=100:99.6, weigh particular amounts of lithium carbonate and the Al—Ni codoped $Co_3O_4$ precursor obtained after step (2), stir the lithium carbonate and the Al—Ni codoped $Co_3O_4$ precursor to obtain a homogeneous mixture, place the mixture in the muffle furnace to sinter the mixture at 1050° C. for 12 h, and then perform comminution processing on a sintered resultant, to obtain Al—Ni codoped lithium cobalt oxide $LiCo_{0.996}Al_{0.003}Ni_{0.001}O_2$ with homogeneously distributed particles.

(4) According to a mole ratio Li:Co:Ni: $LiCo_{0.996}Al_{0.003}Ni_{0.001}O_2$=0.5:0.25:0.25:99.5, weigh particular amounts of lithium carbonate, cobalt carbonate, nickel acetate, and $LiCo_{0.996}Al_{0.003}Ni_{0.001}O_2$ prepared after step (3), and stir the lithium carbonate, the cobalt carbonate, the nickel acetate, and $Li_{0.996}Al_{0.003}Ni_{0.001}O_2$ to obtain a homogeneous mixture, place the mixture in the muffle furnace to sinter the mixture at 950° C. for 12 h, and then perform comminution processing on a sintered resultant, to obtain a doped and surface coating co-modified lithium cobalt oxide positive electrode material $0.005LiCo_{0.5}Ni_{0.5}O_2 \cdot 0.995LiCo_{0.996}Al_{0.003}Ni_{0.001}O_2$.

Embodiment 4

A lithium cobalt oxide positive electrode material is formed by doping lithium cobalt oxide with Al and Mn and coating the doped lithium cobalt oxide with $Li_{1.06}(Ni_{0.425}Co_{0.15}Mn_{0.425})_{0.94}O_2$. A molecular formula of the lithium cobalt oxide positive electrode material is $0.005Li_{1.06}(Ni_{0.425}Co_{0.15}Mn_{0.425})_{0.94}O_2 \cdot 0.995Li_{1.02}Co_{0.994}Al_{0.004}Mn_{0.002}O_2$. A method for preparing same includes the following steps.

(1) Dissolve $CoSO_4$ and $Al_2(SO_4)_3$ by using deionized water, and prepare a mixed salt solution with a mole ratio Co:Al=99.4:0.4, where a concentration of $Co^{2+}$ in the mixed salt solution is 1.25 mol/L; prepare a complexing agent solution by using a strong ammonia solution and distilled water at a volume ratio of 1:10; use a sodium carbonate solution of 1.2 mol/L as a precipitating agent solution; inject the precipitating agent solution whose volume is ⅓ of the volume of a reaction kettle in the reaction kettle, under an effect of intense stirring and protection of an inert gas, use a manner of parallel flow control to continue to inject the mixed salt solution, the complexing agent solution, and the precipitating agent solution in the reaction kettle at the same time to enable the mixed salt solution, the complexing agent solution, and the precipitating agent solution to react, where a speed of the parallel flow control does not exceed 200 L/h, perform stirring at the same time, where a stirring speed does not exceed 200 rpm, control a pH value of a reaction system to be 6 to 12, and during reactions, control a temperature of the reaction kettle to be between 70° C. and 80° C.; during reactions, monitor in real time liquid phase ion concentrations of doped elements Al and Co in the reaction system; and perform 4 times of repeated crystallization by means of continuous reactions, and then perform centrifugal filtering, to obtain an Al-doped precursor cobalt salt.

(2) Place the Al-doped precursor cobalt salt obtained after step (1) in a muffle furnace, perform high-temperature decomposition at 900° C., where a decomposition time is 6 h, and then perform comminution processing on a resultant of the decomposition, to obtain an Al-doped $Co_3O_4$ precursor with homogeneously distributed particles.

(3) According to a mole ratio Li:Co:Mn=102:99.4:0.2, weigh particular amounts of lithium carbonate, manganese acetate, and the Al-doped $Co_3O_4$ precursor obtained after step (2), stir the lithium carbonate, the manganese acetate, and the Al-doped $Co_3O_4$ precursor to obtain a homogeneous mixture, place the mixture in the muffle furnace to sinter the mixture at 1050° C. for 12 h, and then perform comminution processing on a sintered resultant, to obtain Al—Mn codoped lithium cobalt oxide $Li_{1.02}Co_{0.994}Al_{0.004}Mn_{0.002}O_2$ with homogeneously distributed particles.

(4) According to a mole ratio Li:Ni:Co:Mn: $Li_{1.02}Co_{0.994}Al_{0.004}Mn_{0.002}O_2$=0.53:0.2125:0.075:0.2125:99.5, weigh particular amounts of lithium carbonate, nickel acetate, cobalt carbonate, manganese acetate, and $Li_{1.02}Co_{0.994}Al_{0.004}Mn_{0.002}O_2$ prepared after step (3), stir the lithium carbonate, the nickel acetate, the cobalt carbonate, the manganese acetate, and $Li_{1.02}Co_{0.994}Al_{0.004}Mn_{0.002}O_2$ to obtain a homogeneous mixture, place the mixture in the muffle furnace to sinter the mixture at 950° C. for 12 h, and then perform comminution processing on a sintered resultant, to obtain a doped and surface coating co-modified lithium cobalt oxide positive electrode material $0.005Li_{1.06}(Ni_{0.425}Co_{0.15}Mn_{0.425})_{0.94}O_2 \cdot 0.995Li_{1.02}Co_{0.994}Al_{0.004}Mn_{0.002}O_2$.

It can be learned from above that by combining actual applications in the academic field and the industrial field, carrying out pioneering researches, and making process improvement, the present application provides a lithium cobalt oxide positive electrode material and a method for preparing same. The lithium cobalt oxide positive electrode material includes doped lithium cobalt oxide and a surface coating layer covering the doped lithium cobalt oxide. By means of doping in the present application, that is, doping of a polyvalent element and a monovalent element, structural stability and cycling performance of the lithium cobalt oxide positive electrode material are improved. The doped polyvalent element is Ni, Mn, V, Mo, Nb, Cu, Fe, In, W or Cr, and the doped monovalent element is Al, Ga, Hf, Mg, Sn, Zn or Zr. On one hand, the monovalent element substitutes for a cobalt position and replaces a cobalt ion by means of substitutional doping, to ensure that a framework and a cobalt position of a layered structure do not mutate due to oxidation, so that stability of the layered structure of the lithium cobalt oxide positive electrode material can be improved during high-voltage use. On the other hand, by means of interstitial doping, the polyvalent element is filled between a cobalt-ion layer and an oxygen-ion layer of a main sheet of a lattice structure of the lithium cobalt oxide. Specifically, a polyvalent element ion is filled in a tetrahedral space formed with one cobalt ion and three oxygen ions on an oxygen-ion layer being vertices, or, is filled in a tetrahedral space formed with one oxygen ion and three cobalt ions on a cobalt-ion layer being vertices. During charging and discharging, not only the polyvalent element iron is oxidized prior to $Co^{3+}$ in an oxidizing atmosphere, so that oxidation of $Co^{3+}$ can be delayed, but also during oxidation of the polyvalent element ion, an ionic radius of the polyvalent element ion changes because of a loss of an electron, thereby increasing adaptability of a lattice, so as to mitigate or release stress caused by variation of the framework of the layered structure, and stabilize the layered structure of the lithium cobalt oxide. In the present application, a principle and a process of a phase change of the layered structure of the lithium cobalt oxide in a high voltage scenario is combined, and advantages of doped elements are fully exploited, thereby significantly improving comprehensive performance of a positive electrode material.

In one embodiment, a surface coating layer covering a surface of doped lithium cobalt oxide is provided. The coating layer includes an inorganic solid electrolytic material and a high-voltage active material. The coating layer can not only be used as a stable interface between a positive electrode material and an electrolytic solution to ensure that the lithium cobalt oxide does not dissolve in the electrolytic solution at a high voltage, but also have desirable electrical conductivity of electrons and lithium ions, so as to facilitate conduction of electrons in an electrode and diffusion of lithium ions, reduce a polarization effect at an interface between the positive electrode material and the electrolytic solution, stabilize a structure after lithium deintercalation, and improve electrochemical performance of the lithium cobalt oxide. A high-voltage lithium cobalt oxide positive electrode material that is prepared by means of doping and surface coating co-modification in this method can be used at a relatively high charge cut-off voltage, thereby increasing energy density of a lithium-ion battery and further obtaining an excellent cyclic service life.

Further, a liquid phase method and a solid phase method are used for preparation in the present application, and advantages of the two methods are combined. Doped elements are homogeneously mixed with particles of a cobalt compound in a liquid phase system, so as to homogeneously diffuse into the particles in a sintering process. A product prepared by using the process has excellent crystallization quality, high tap density, desirable processing performance, chemical composition that are close to theoretical values, and an excellent layered structure.

Further, preparation of a substitutional doping precursor by using a controlled crystallization method and solid phase sintering to synthesize a high-voltage lithium cobalt oxide product are comprehensively considered in the present application. Existing equipment may be used to perform scale industrial production.

In another embodiment, a doped and surface coating co-modified lithium cobalt oxide positive electrode material is provided. The positive electrode material includes doped lithium cobalt oxide and a surface coating layer. General chemical composition of the positive electrode material is, for example, $\alpha Li_{\gamma 1} Mc_{\gamma 2} O_{\gamma 3} \cdot \beta Li_{1+z} Co_{1-x-y} Ma_x Mb_y O_2$ (generally, $0 < \alpha \leq 0.08$, and $0.92 \leq \beta \leq 1$; $0 \leq x \leq 0.01$, $0 \leq y \leq 0.01$, and $-0.05 \leq z \leq 0.08$; and γ1, γ2, and γ3 may be any positive numbers, but need to satisfy valence distribution).

A general formula of the doped lithium cobalt oxide is $Li_{1+z}Co_{1-x-y}Ma_xMb_yO_2$ (generally, $0 \leq x \leq 0.01$, $0 \leq y \leq 0.01$, and $-0.05 \leq z \leq 0.08$; preferably, $0.0005 \leq x \leq 0.005$, $0.0005 \leq y \leq 0.005$, and $-0.01 \leq z \leq 0.03$). Ma is one or more of the following doped monovalent elements: Al, Ga, Hf, Mg, Sn, Zn, or Zr. Mb is one or more of the following doped polyvalent elements: Ni, Mn, V, Mo, Nb, Cu, Fe, In, W, or Cr.

Chemical composition of the surface coating layer is $Li_{\gamma 1}Mc_{\gamma 2}O_{\gamma 3}$. Mc is generally a metal element and a transition metal element, for example, one or more of Cr, Co, Ni, Cu, Mn, Ti, Zr, Hf, La, Nb, In, W, Ta, Ba, Te, Y, Sb, or P. γ1, γ2, and γ3 may be any positive numbers, but need to satisfy valence distribution.

It may be understood that the doped lithium cobalt oxide and a coating structure of the doped lithium cobalt oxide are not required to be used together. As an independent material, a doped lithium cobalt oxide substrate may be used independently without needing a coating structure.

Figure 10:
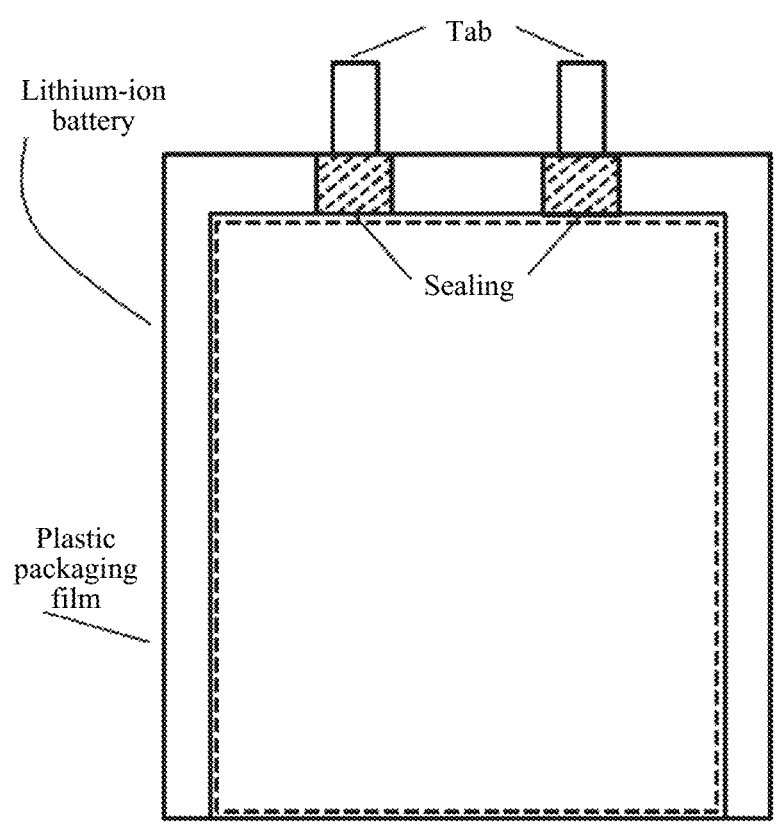
FIG. 10 is a schematic diagram of a lithium-ion battery including a lithium cobalt oxide positive electrode material according to one embodiment.

In one embodiment, a lithium-ion battery is provided. As shown in FIG. 10, the lithium-ion battery includes a positive electrode plate, a negative electrode plate, an isolation film placed between the positive electrode plate and the negative electrode plate, and an electrolytic solution. The positive electrode plate includes a positive electrode current collector and a positive electrode active substance layer distributed on the positive electrode current collector. The positive electrode active substance layer uses the foregoing doped and surface coating co-modified high-voltage lithium cobalt oxide positive electrode material as a positive electrode active substance. An active capacity of this high-voltage lithium cobalt oxide is greater than 190 mAh/g. In one embodiment, an electronic device is provided. The electronic device uses the foregoing lithium-ion battery. The electronic device may be a mobile terminal, including a housing, a working circuit, and a charging port mounted on the housing. The mobile terminal includes the lithium-ion battery. The lithium-ion battery is configured to provide electrical energy to the working circuit and perform charging by using the charging port.

What is claimed is:

1. A lithium cobalt oxide positive electrode material, wherein the lithium cobalt oxide positive electrode material comprises doped lithium cobalt oxide, and a formula of a substance forming the doped lithium cobalt oxide is $Li_{1+z}Co_{1-x-y}Ma_xMb_yO_2$, wherein
  $0 \leq x \leq 0.01$, $0 \leq y \leq 0.01$, and $-0.05 \leq z \leq 0.08$;
  Ma is a doped monovalent element, and Ma is at least one of Al, Ga, Hf, Mg, Sn, Zn, or Zr;
  Mb is a doped polyvalent element, and Mb is at least one of Ni, Mn, V, Mo, Nb, Cu, Fe, In, W, or Cr; and
  a lattice of the doped lithium cobalt oxide comprises a main sheet formed of a cobalt-ion layer and an oxygen-ion layer and lithium-ion layers distributed on two sides of the main sheet, the main sheet further comprises the doped monovalent element Ma and the polyvalent element Mb, and the monovalent element Ma is used to substitute for a cobalt ion in the main sheet, wherein the polyvalent element Mb is filled between a cobalt-ion layer and an oxygen-ion layer of the main sheet.

2. The lithium cobalt oxide positive electrode material according to claim 1, wherein the polyvalent element Mb is located in a tetrahedral space formed with one cobalt ion and three oxygen ions on an oxygen-ion layer being vertices, or, the polyvalent element Mb is located in a tetrahedral space formed with one oxygen ion and three cobalt ions on a cobalt-ion layer being vertices.

3. The lithium cobalt oxide positive electrode material according to claim 1, wherein the monovalent element Ma and the main sheet are bonded through ionic bonding, the main sheet comprises an oxygen-ion layer, a cobalt-ion layer, and an oxygen-ion layer that are sequentially arranged, and the cobalt-ion layer is located between the two oxygen-ion layers.

4. The lithium cobalt oxide positive electrode material according to claim 1, wherein a variation range of a c-axis size of a lattice of the lithium cobalt oxide positive electrode material is 14.055 Å to 14.095 Å.

5. The lithium cobalt oxide positive electrode material according to claim 1, wherein $0.0005 \leq x \leq 0.005$.

6. The lithium cobalt oxide positive electrode material according to claim 1, wherein $0.0005 \leq y \leq 0.005$.

7. The lithium cobalt oxide positive electrode material according to claim 1, wherein $0.01 \leq z \leq 0.03$.

8. The lithium cobalt oxide positive electrode material according to claim 1, wherein the lithium cobalt oxide positive electrode material further comprises a surface coating layer covering the doped lithium cobalt oxide, the surface coating layer comprises an inorganic solid electrolytic material, and a formula of the inorganic solid electrolytic material is $Li_{\gamma 1}Mc_{\gamma 2}O_{\gamma 3}$, wherein Mc is at least one of Ti, Zr, Hf, La, Nb, In, W, Ta, Ba, Te, Y, or Sb, γ1, γ2, and γ3 are any positive numbers that satisfy a formula γ1+A*γ2=2*γ3, and A is a valence of Mc.

9. The lithium cobalt oxide positive electrode material according to claim 1, wherein the lithium cobalt oxide positive electrode material further comprises a surface coating layer covering the doped lithium cobalt oxide, the surface coating layer comprises a high-voltage active material, and a formula of the high-voltage active material is $Li_{\gamma 1}Mc_{\gamma 2}O_{\gamma 3}$, wherein Mc is at least one of Cr, Co, Ni, Cu, Mn, or P, γ1, γ2, and γ3 are any positive numbers that satisfy a formula γ1+A*γ2=2*γ3, and A is a valence of Mc.

* * * * *